United States Patent [19]

Holly et al.

[11] Patent Number: 4,564,899
[45] Date of Patent: Jan. 14, 1986

[54] I/O CHANNEL BUS

[75] Inventors: Kenneth Holly, San Jose; Gehrard J. Smith, Santa Clara, both of Calif.

[73] Assignee: Elxsi, San Jose, Calif.

[21] Appl. No.: 426,045

[22] Filed: Sep. 28, 1982

[51] Int. Cl.⁴ .............................................. G06F 3/00
[52] U.S. Cl. ................................................... 364/200
[58] Field of Search ... 364/200 MS File, 900 MS File

[56]  References Cited

U.S. PATENT DOCUMENTS

| | | | |
|---|---|---|---|
| 3,787,627 | 1/1974 | Abramson et al. | 364/200 |
| 3,798,613 | 3/1974 | Edstrom et al. | 364/200 |
| 3,810,105 | 5/1974 | England | 364/200 |
| 4,038,641 | 7/1977 | Bouknecht | 364/200 |
| 4,110,830 | 8/1978 | Krygowski | 364/200 |
| 4,228,496 | 10/1980 | Katzman et al. | 364/200 |
| 4,246,637 | 1/1981 | Brown et al. | 364/200 |
| 4,320,457 | 3/1982 | Tanikawa | 364/200 |

Primary Examiner—Thomas M. Heckler
Attorney, Agent, or Firm—Townsend and Townsend

[57] ABSTRACT

A data bus system utilizing logical transfer channels provides high data rates (even over long distances) and good error detection. The basic function of a transfer channel is to enable temporary assignment of some portion of the bus resource to a specific device and then to allow simple, quick addressing of that device by reference to that channel. There are a relatively small number of transfer channels (say four) that may be attached or detached by the channel processor (IOCP) to meet the data flow requirements. For a transfer to occur between the IOCP (15) and a device (30a, 30b), the IOCP (15) first effects an "attach" operation to assign the device (30a, 30b) a transfer channel for the duration of the transfer. Thereafter, the IOCP (15) allocates the bus cycles among the currently attached transfer channels according to any desired priority scheme, subject to the constraint that the device on a transfer channel be ready to send or receive data before that transfer channel may be granted cycles.

23 Claims, 34 Drawing Figures

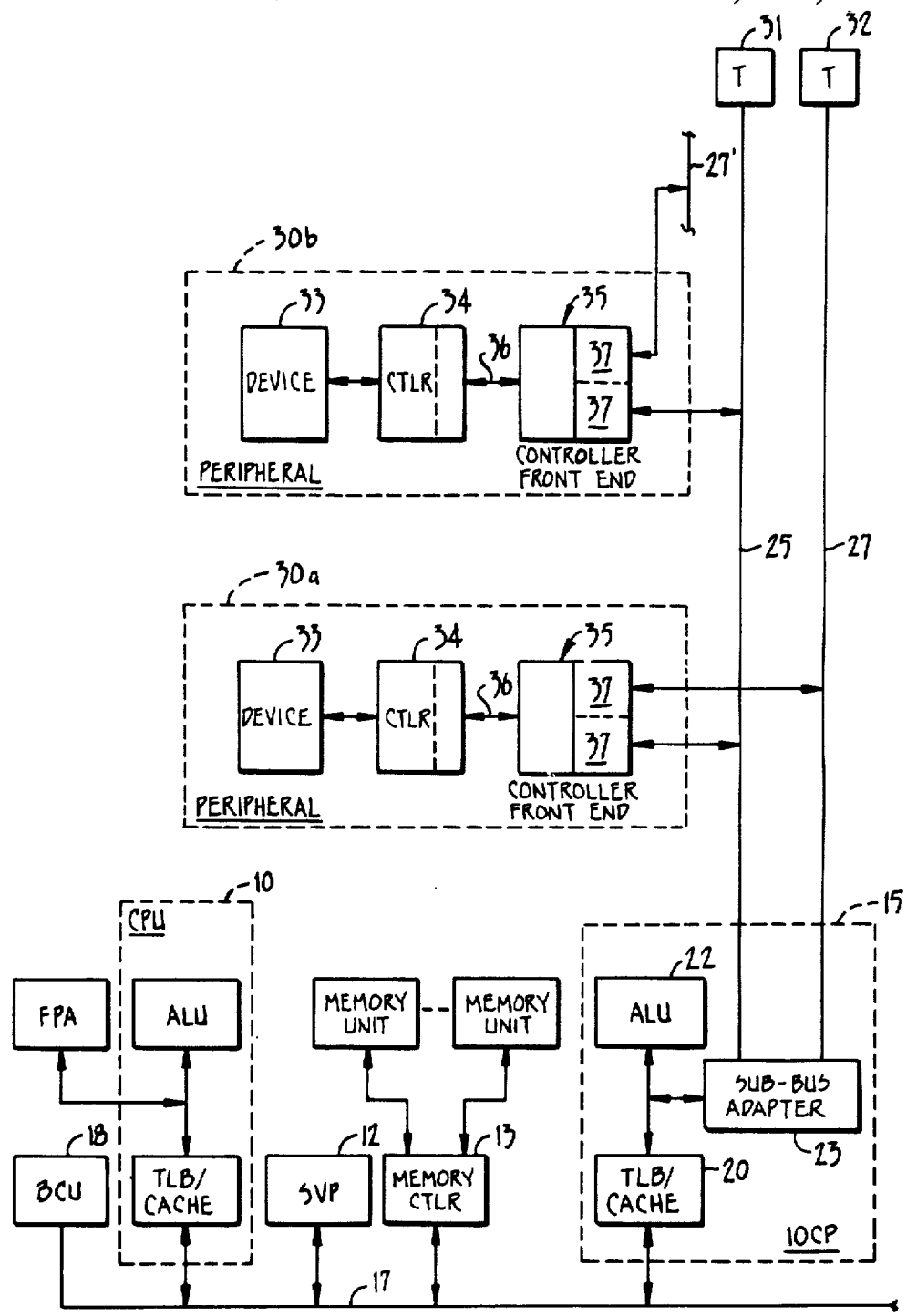
FIG._1.

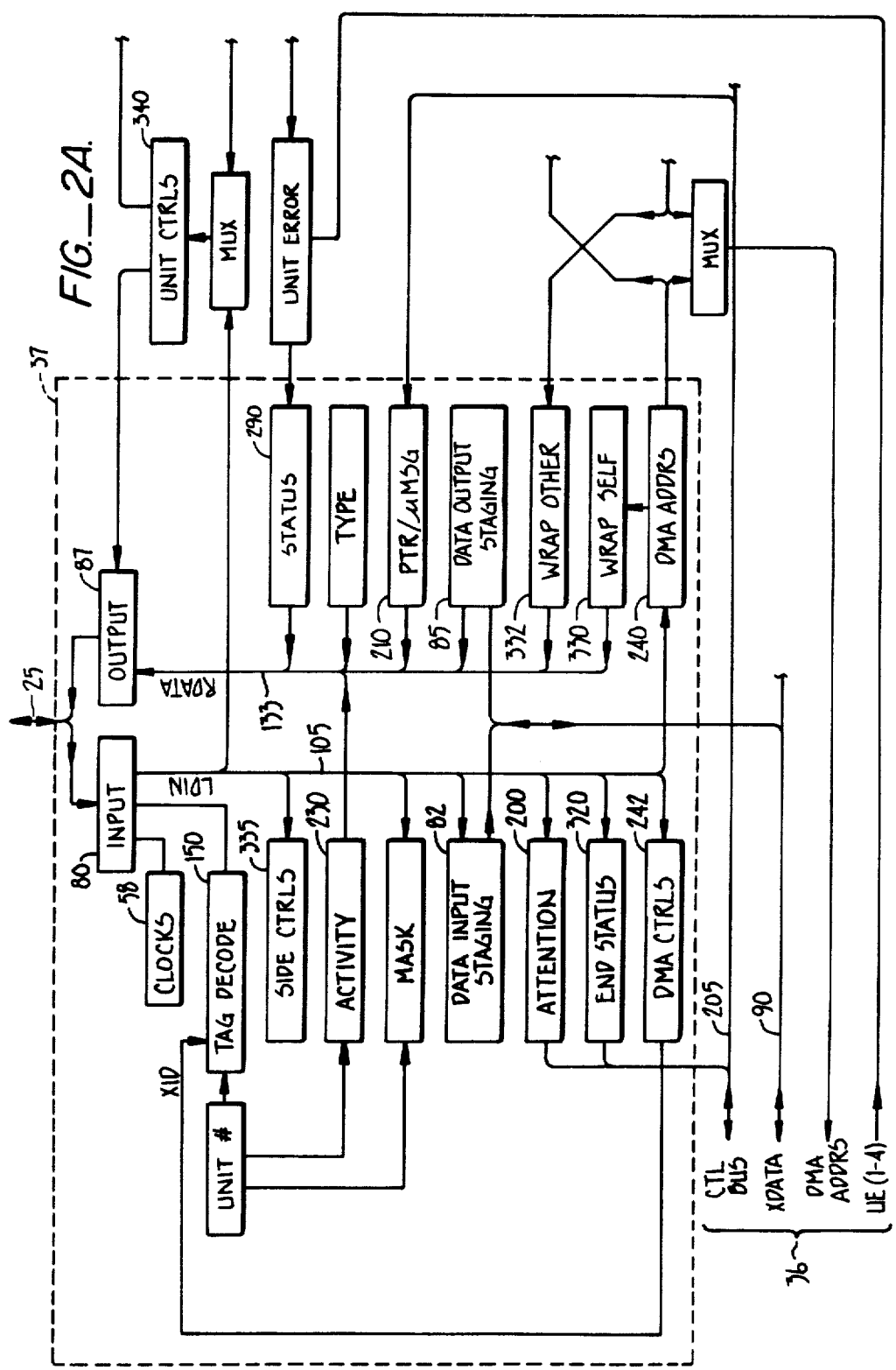

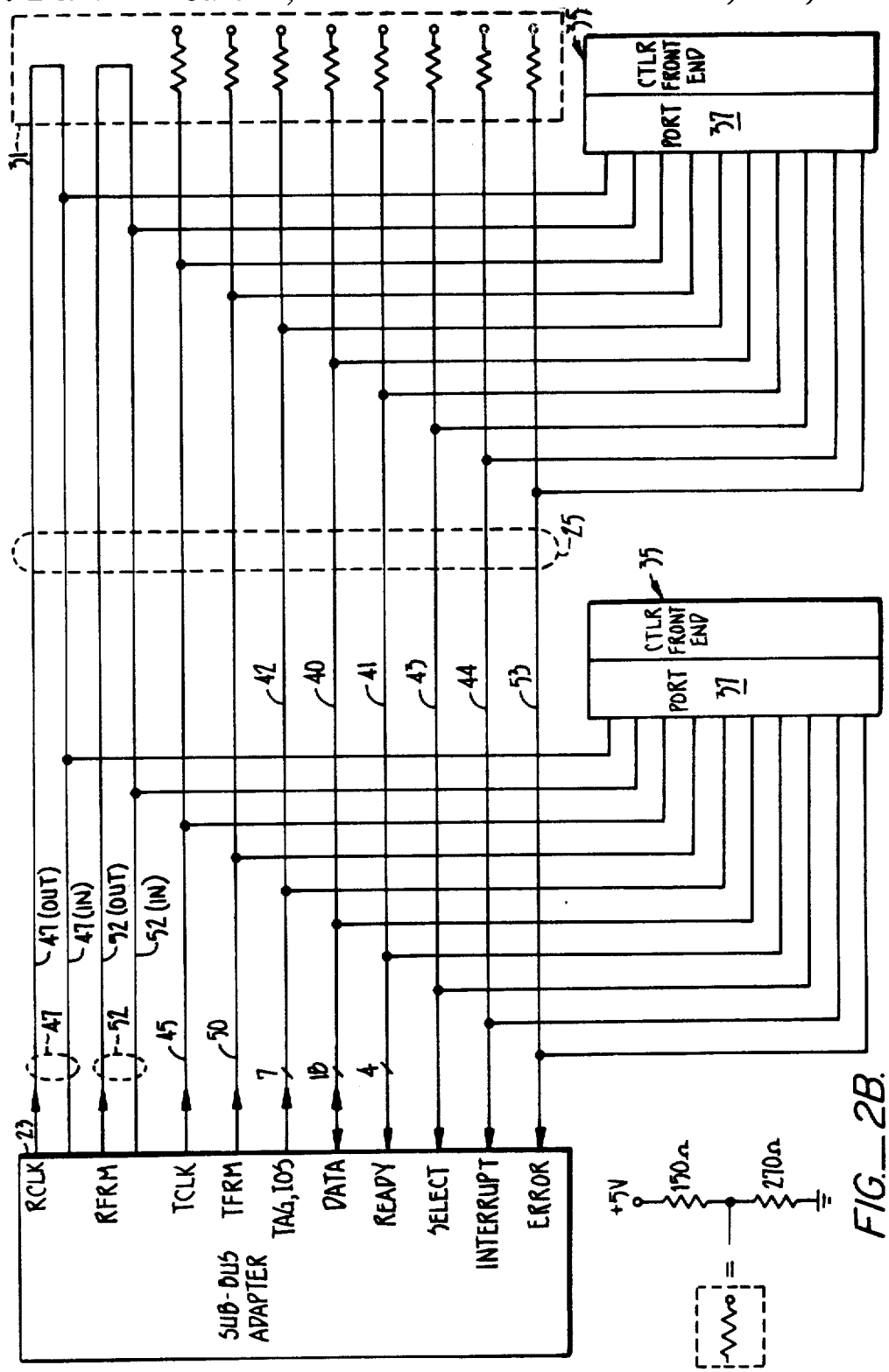

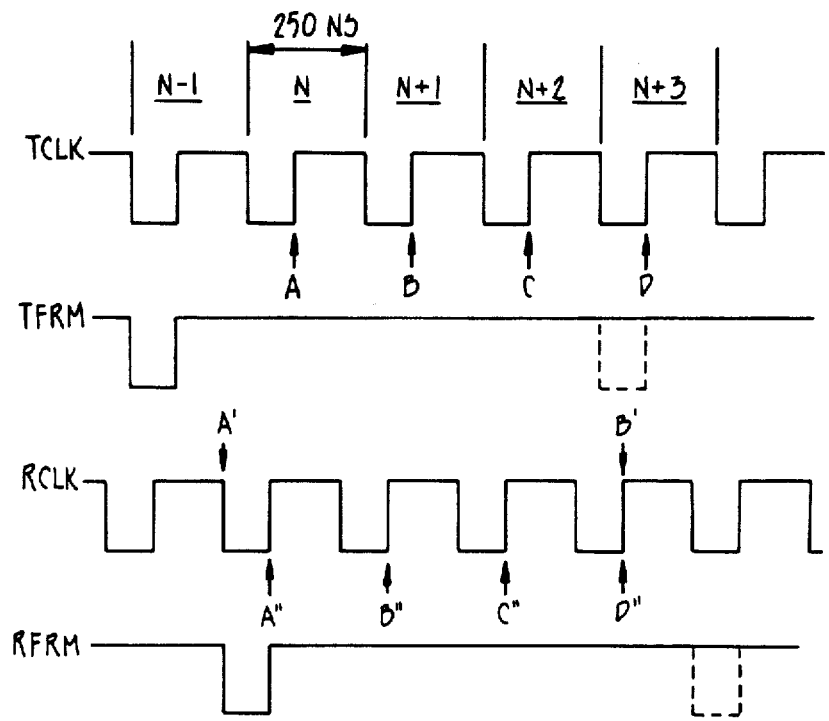
FIG._3.
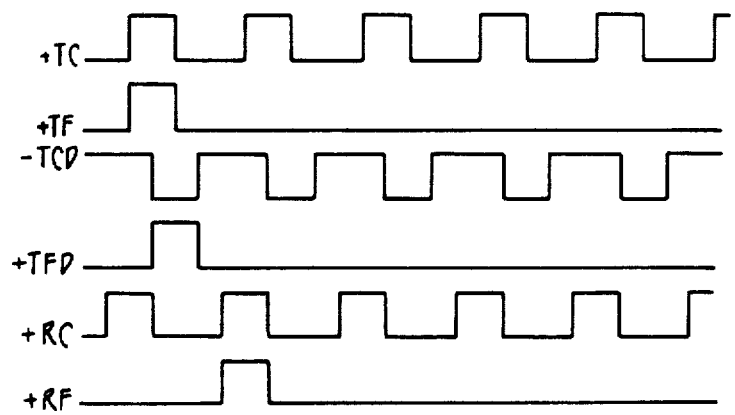
FIG._5.

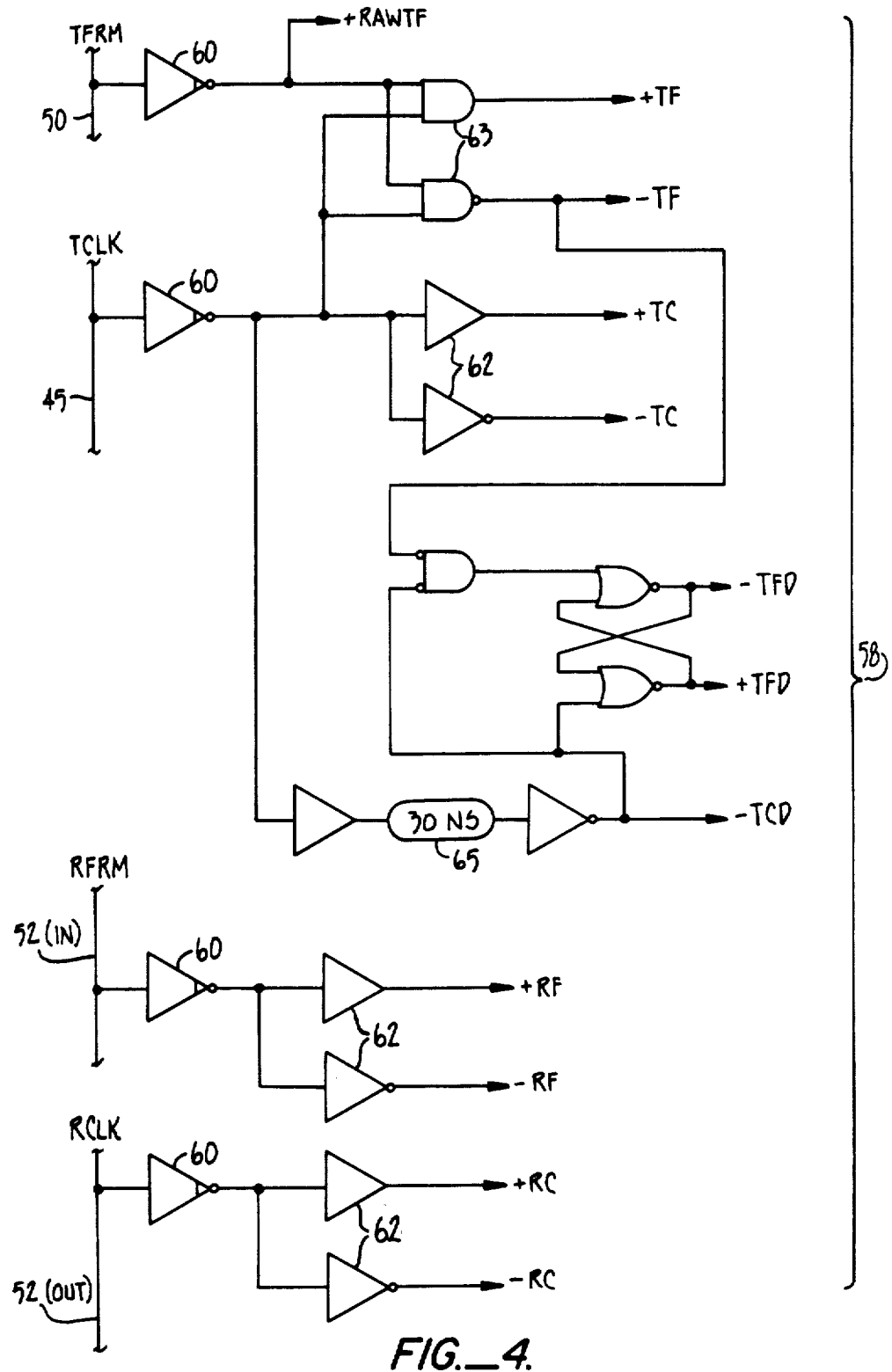
FIG._4.

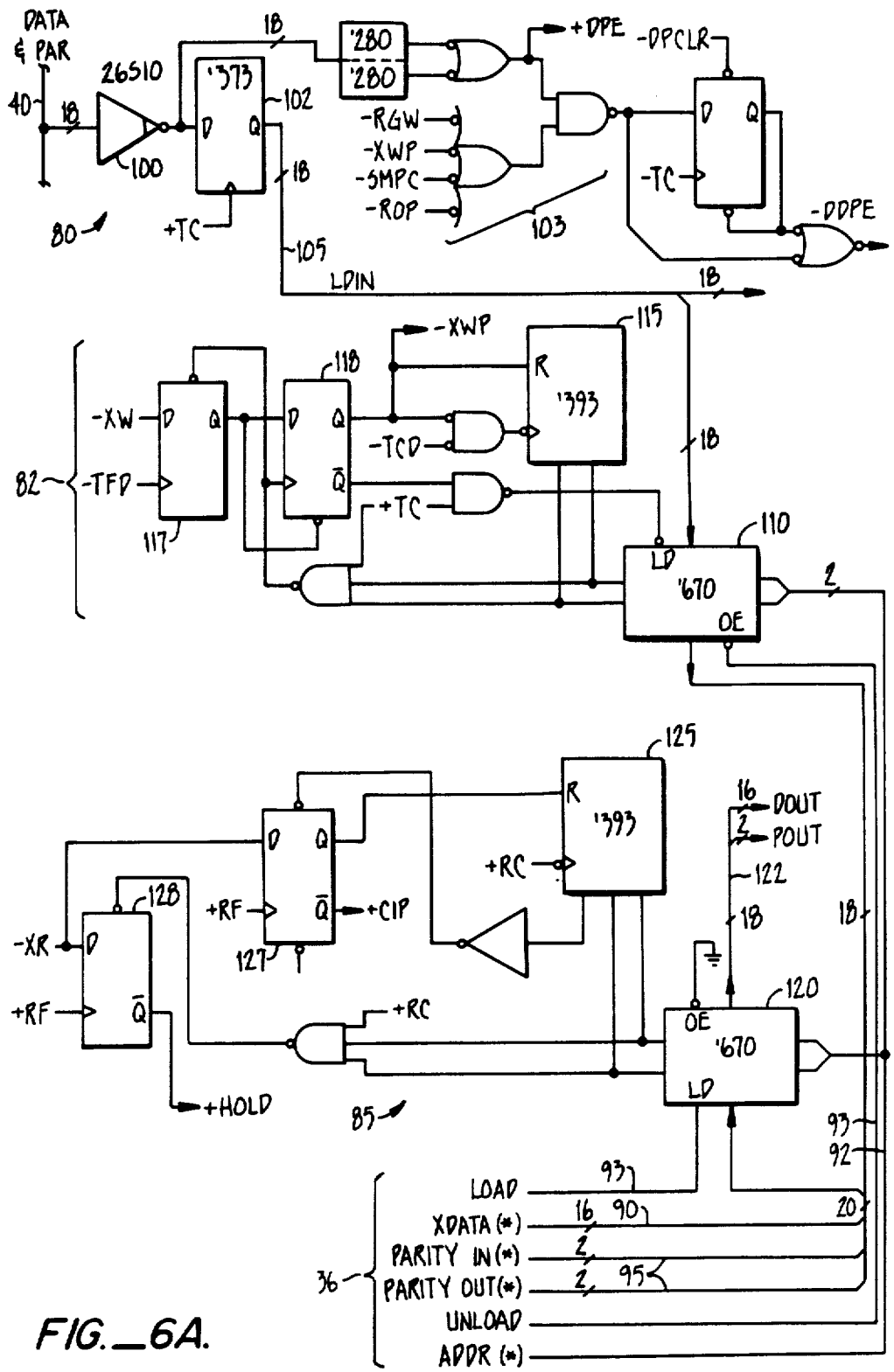
FIG._6A.

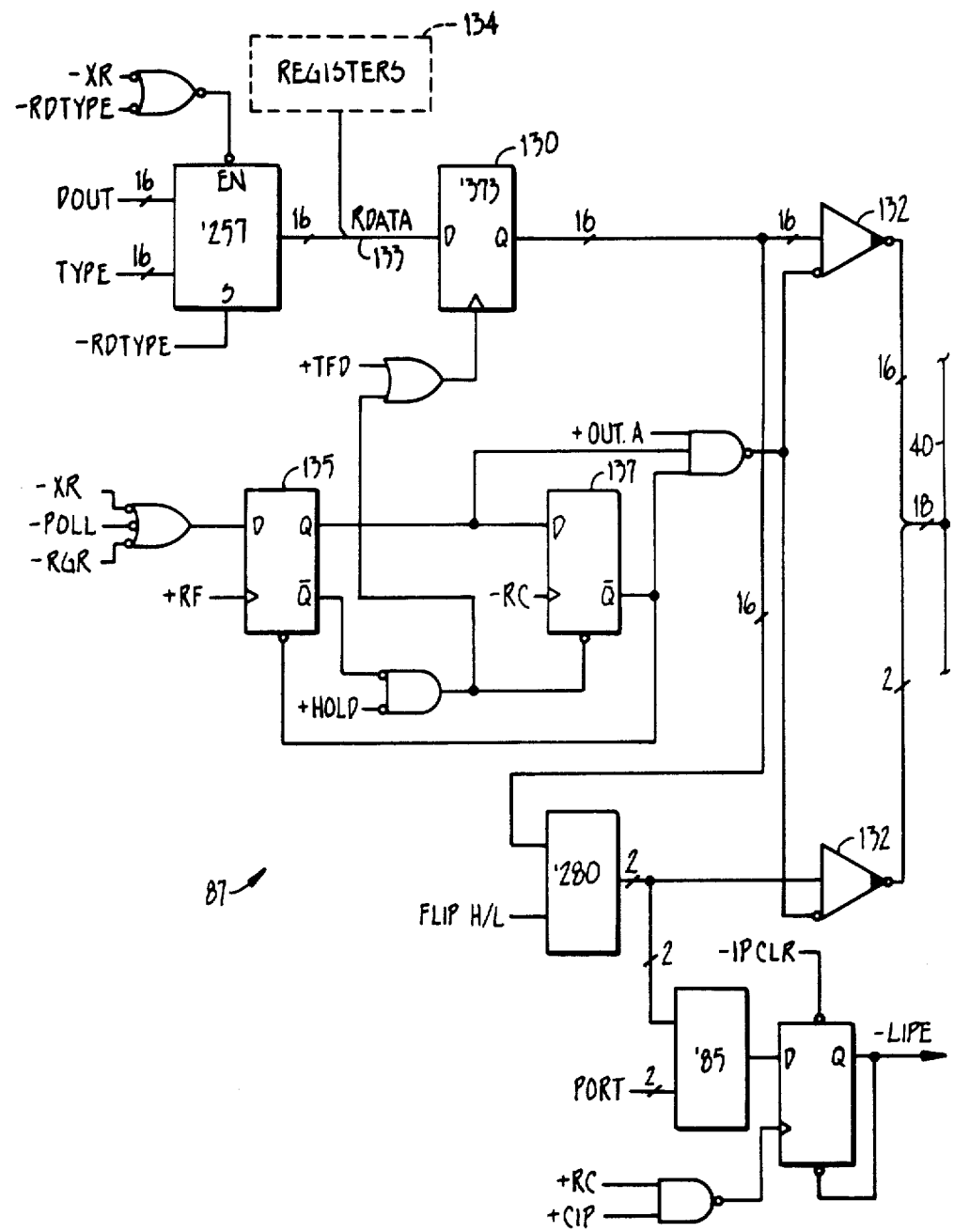
FIG._6B.

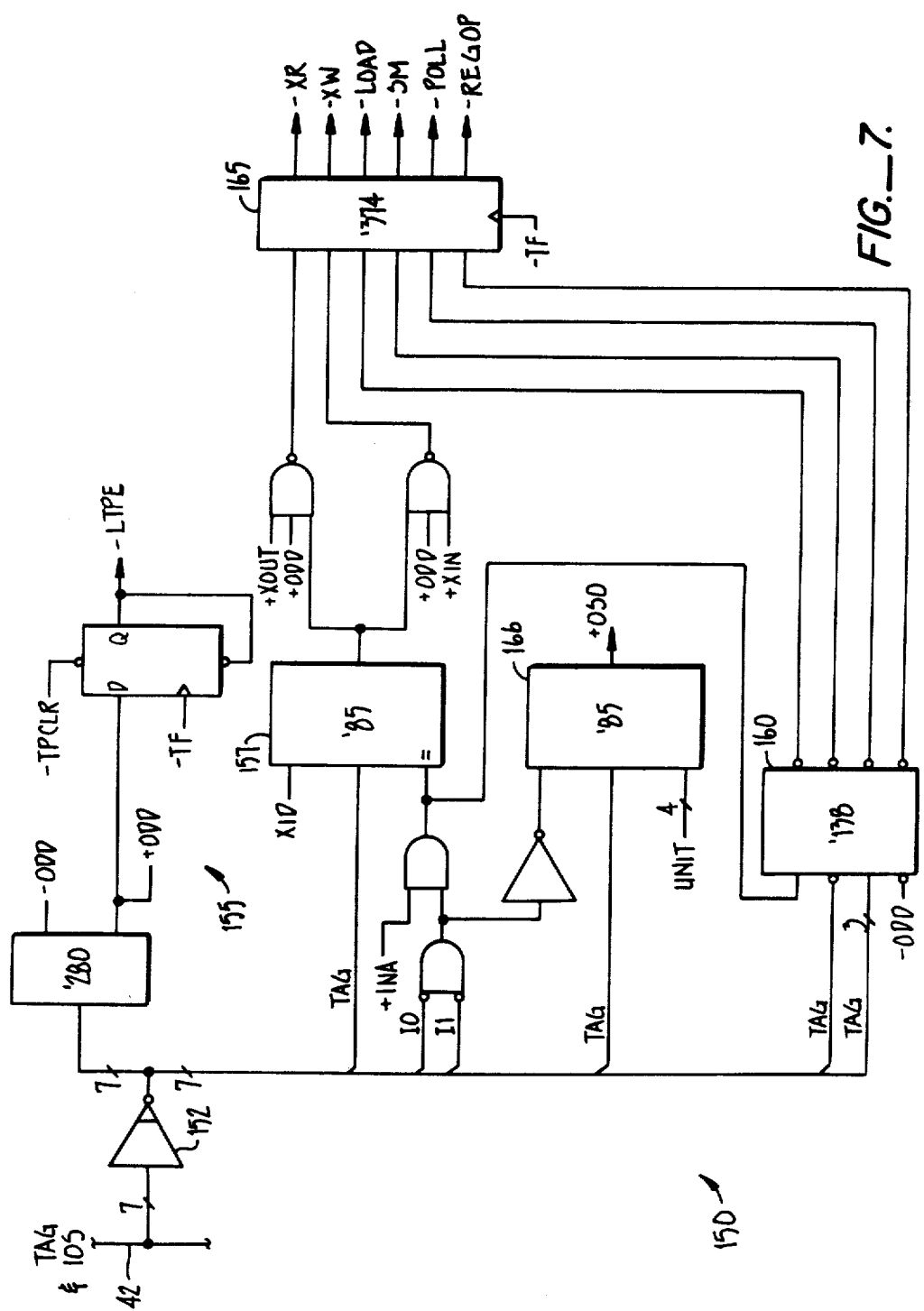
FIG._7.

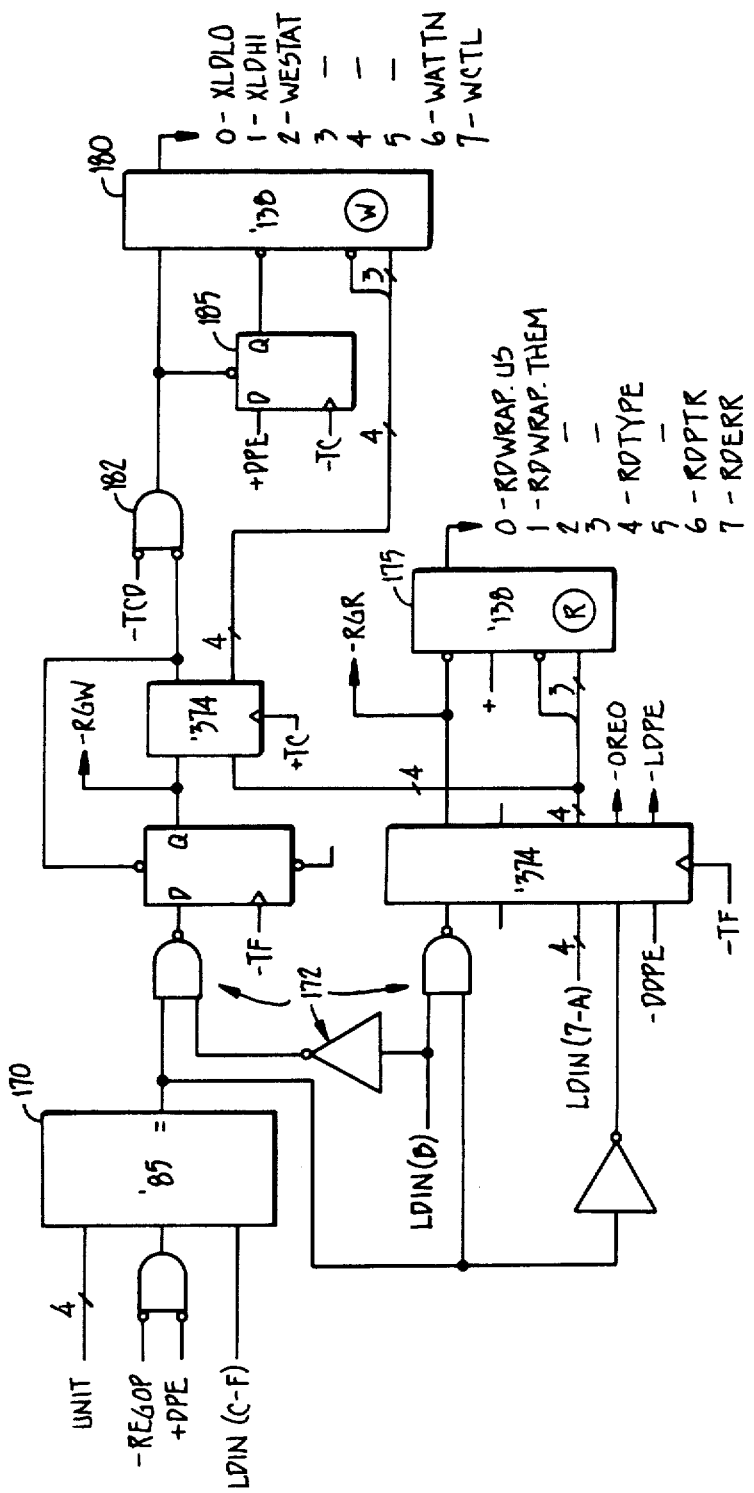
FIG._8.

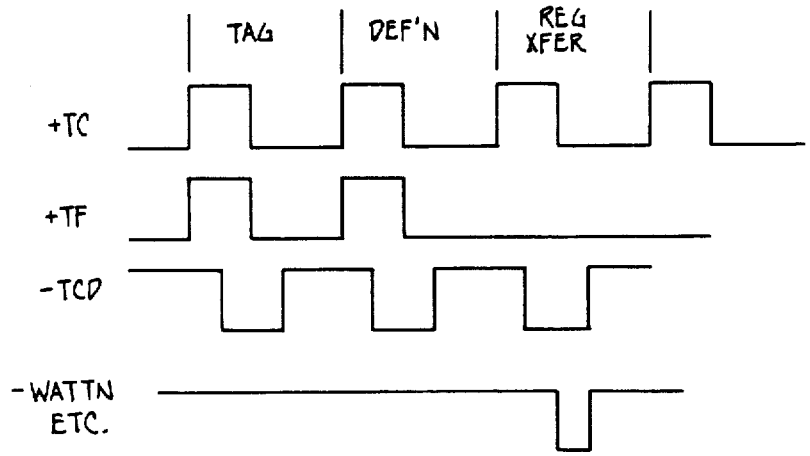
FIG._9.
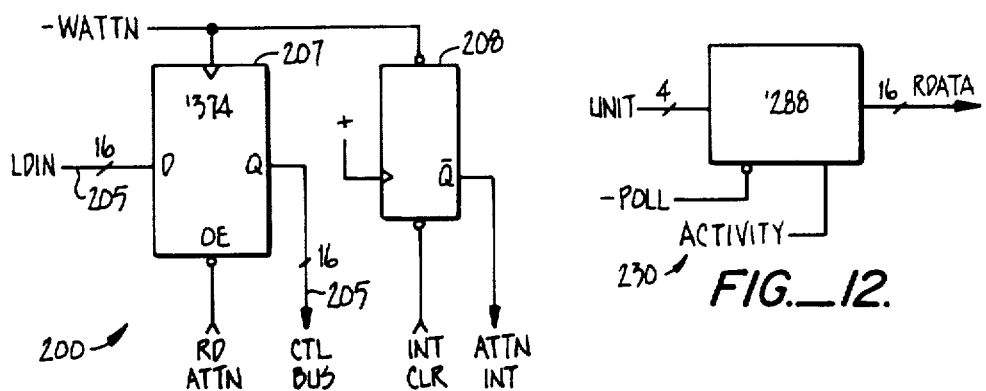
FIG._10.
FIG._12.
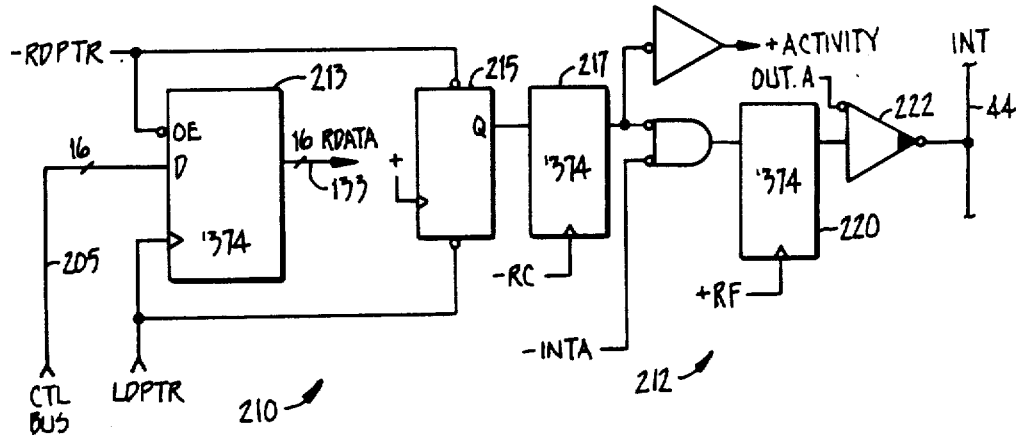
FIG._11.

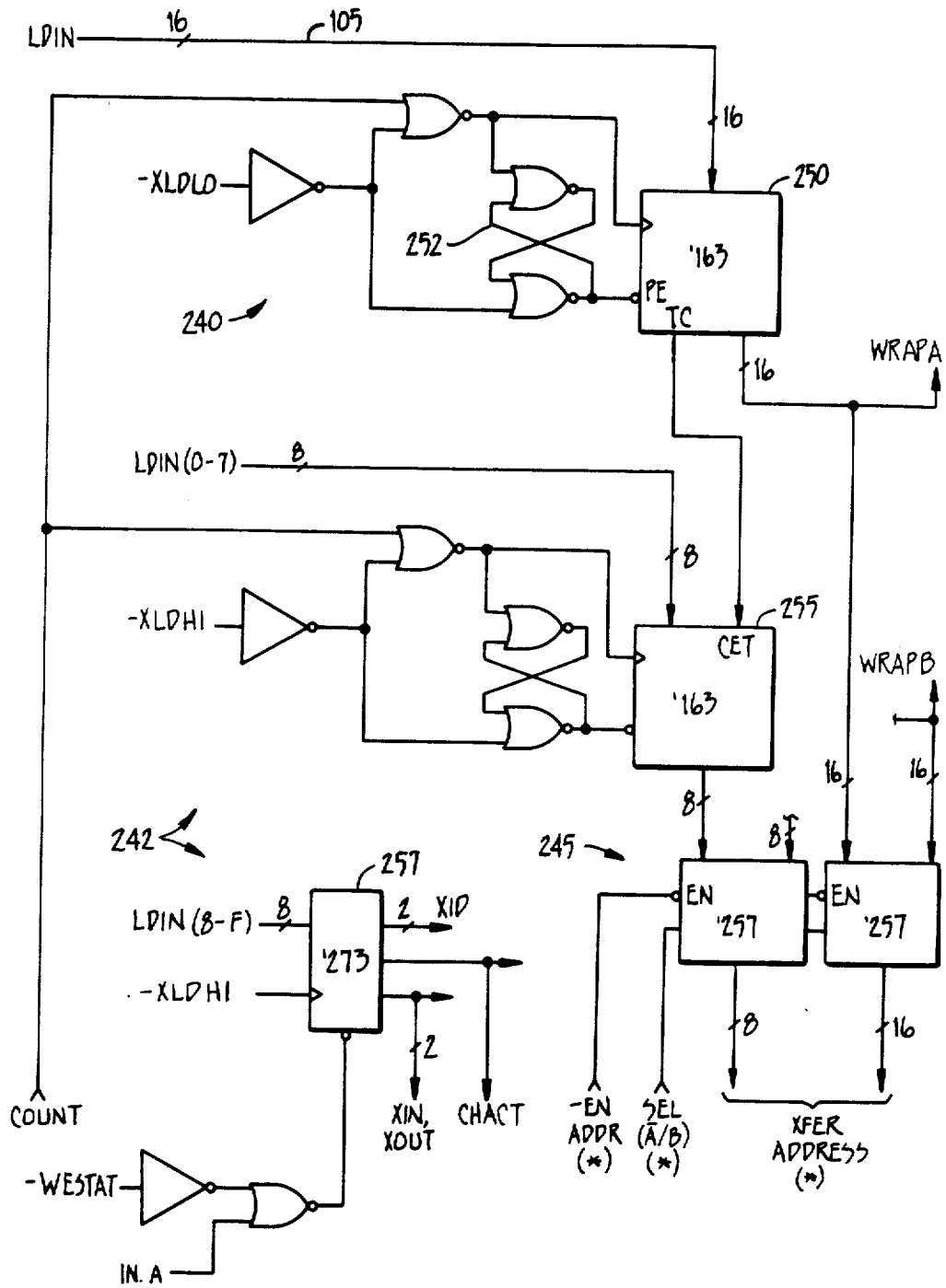
FIG._13.

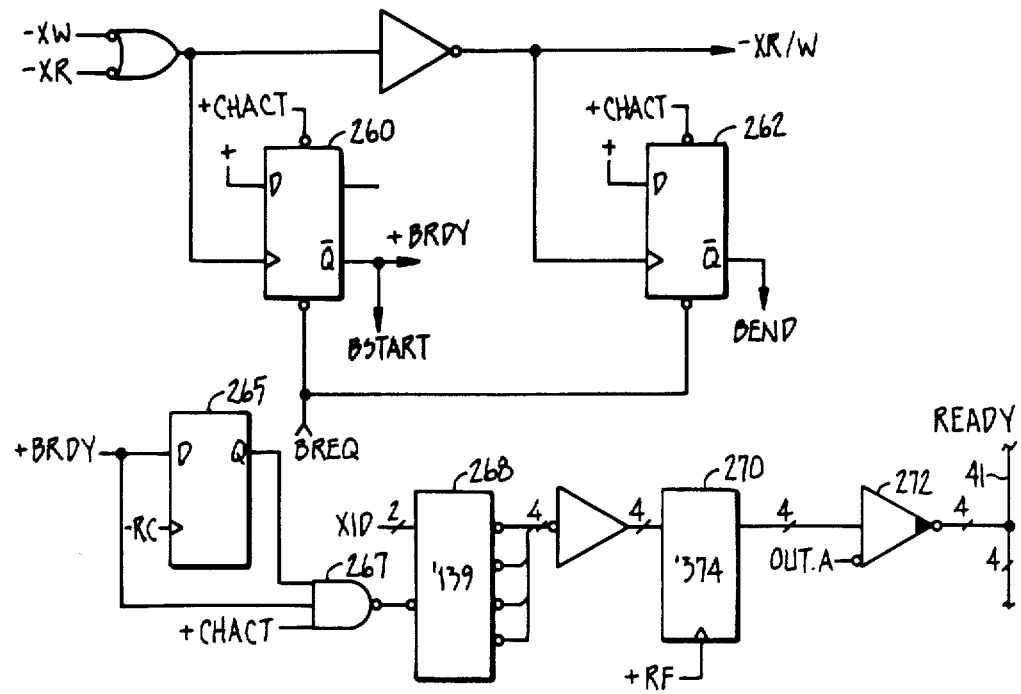
FIG.—14.
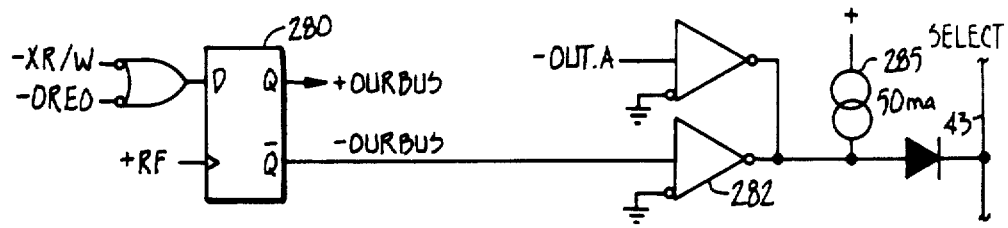
FIG.—15.
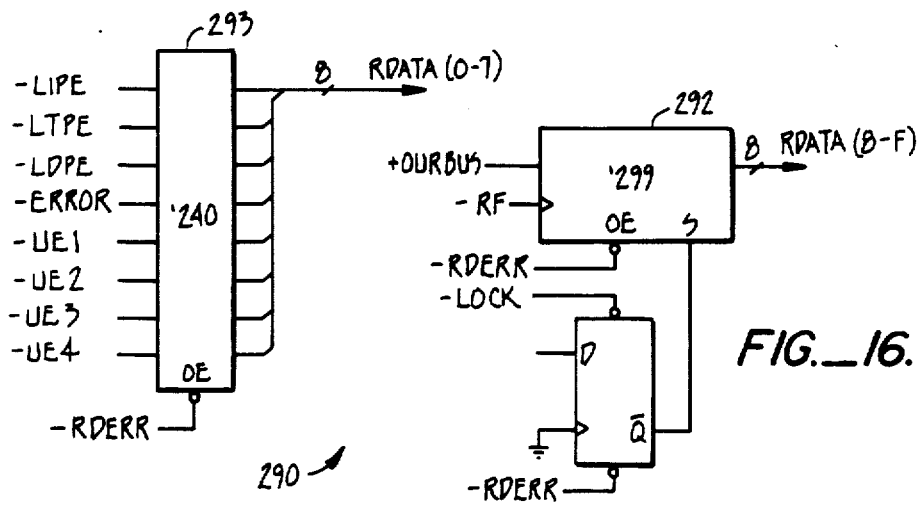
FIG.—16.

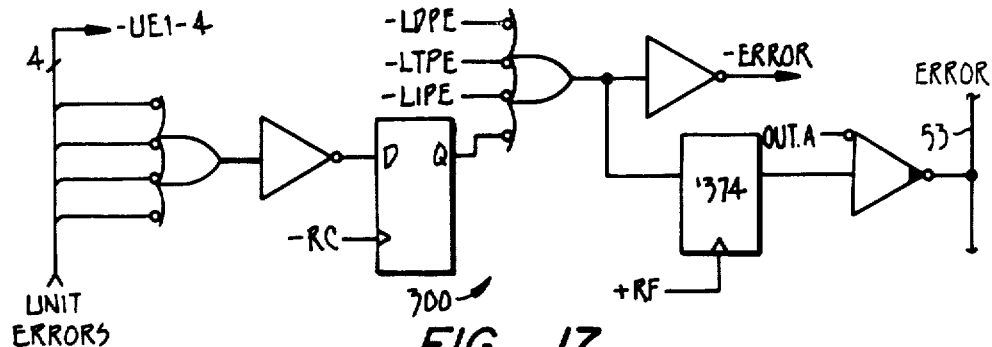
FIG._17.
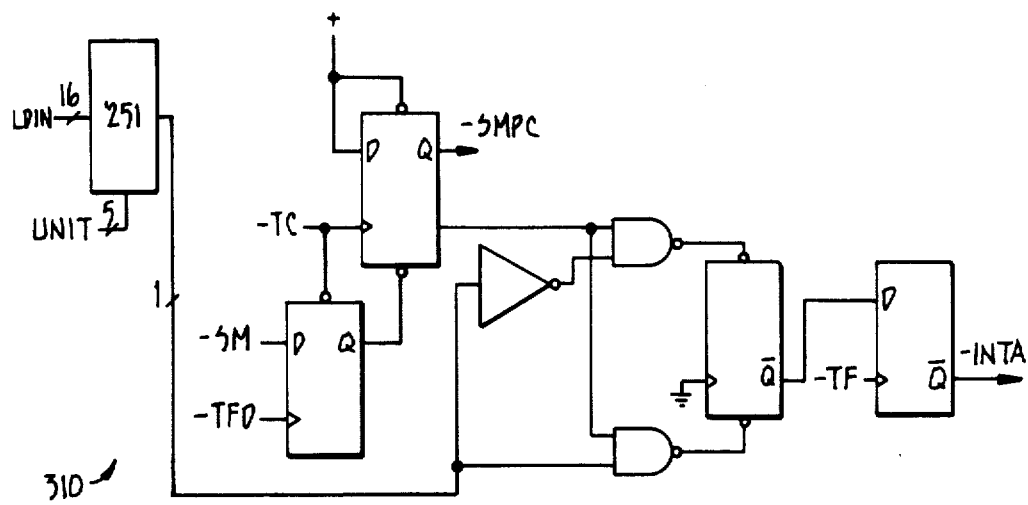
FIG._18.
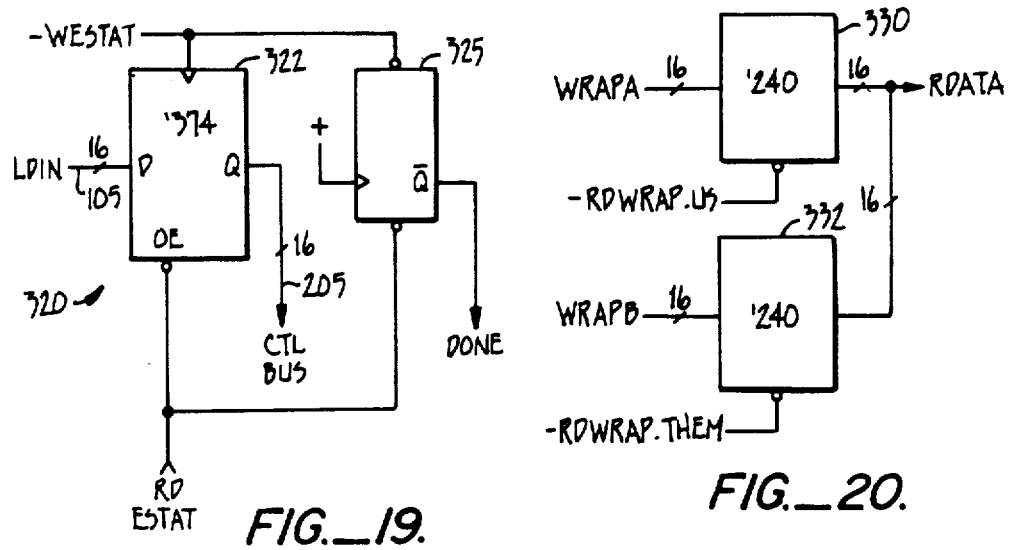
FIG._19.   FIG._20.

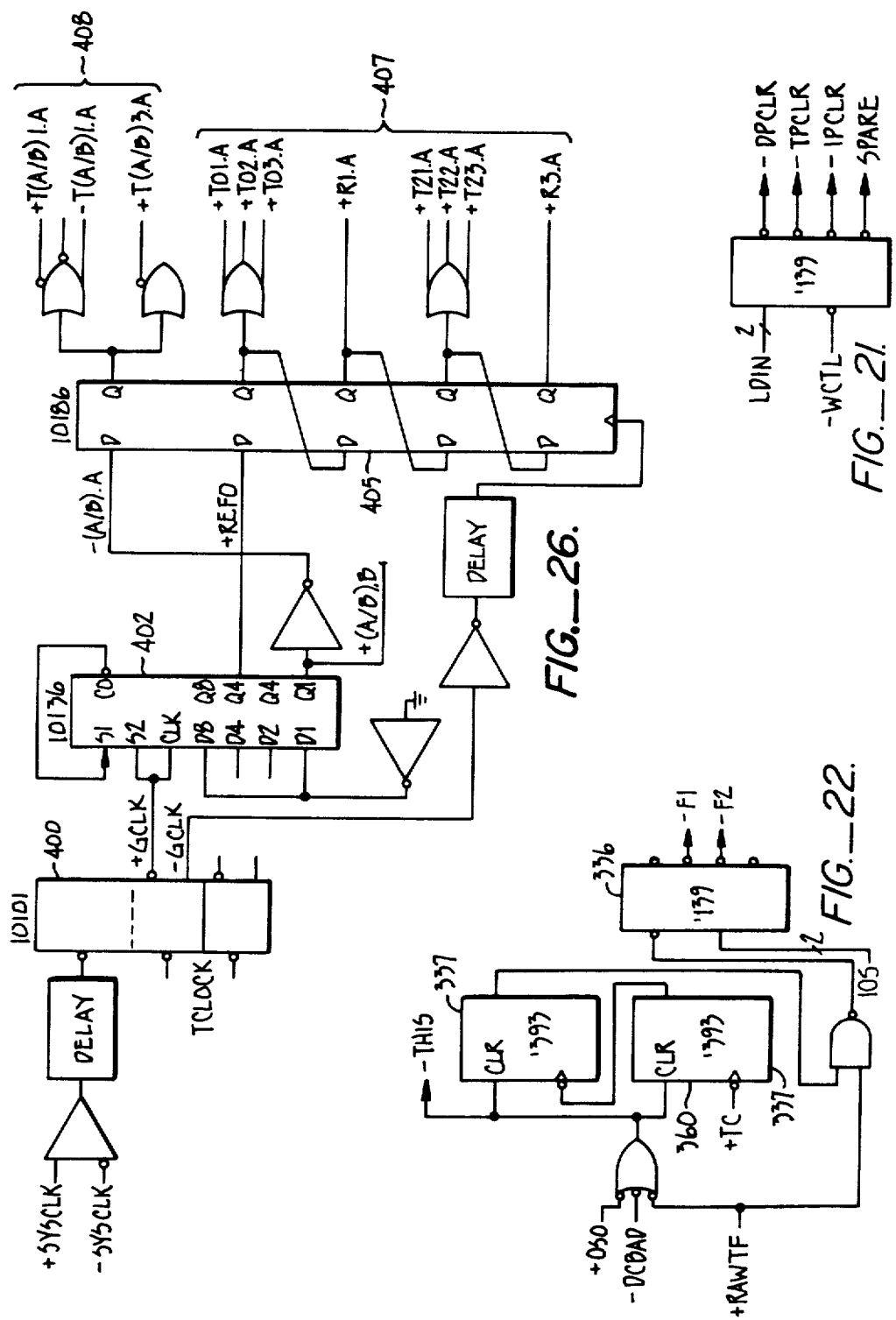

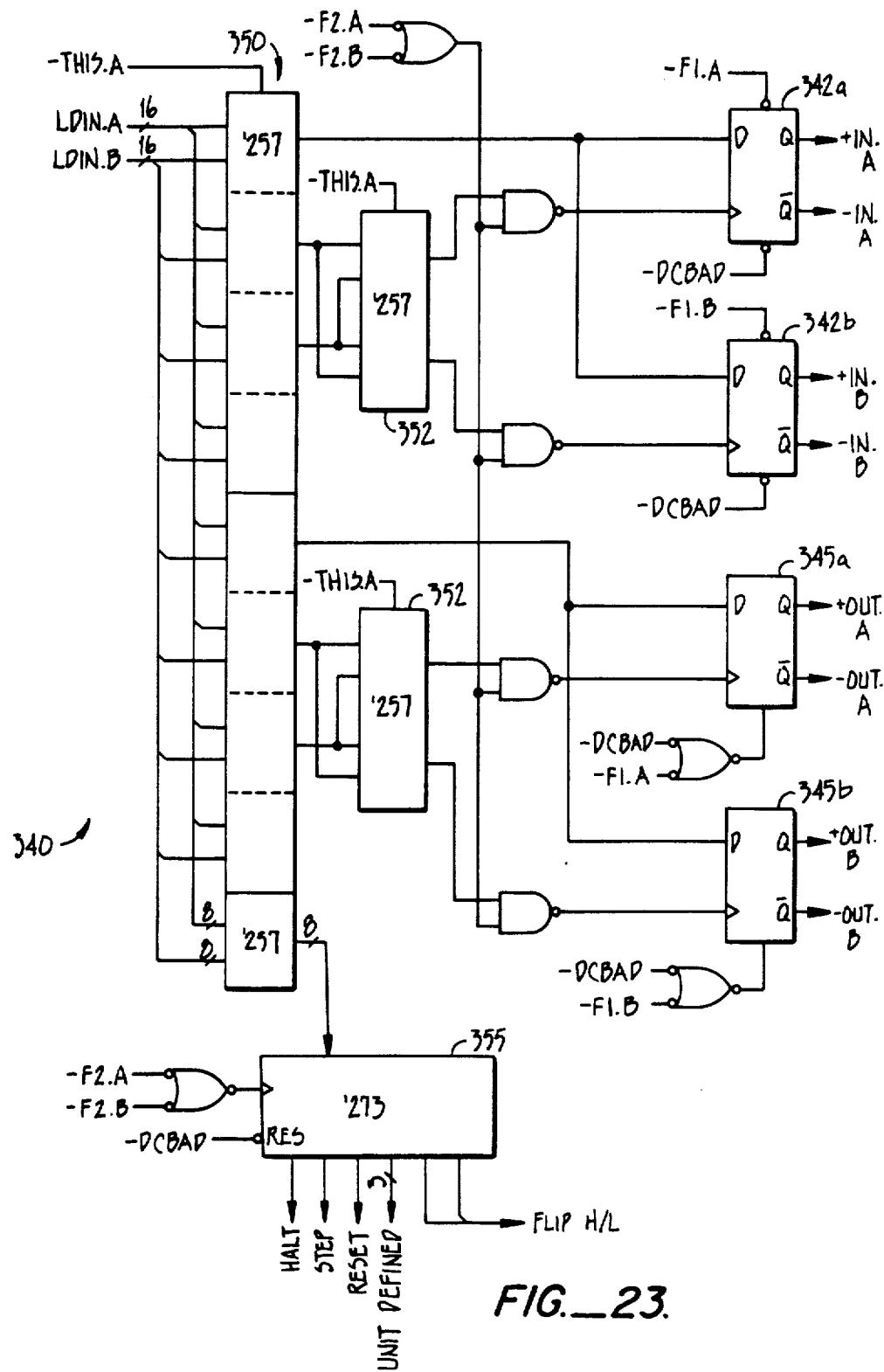
FIG._23.

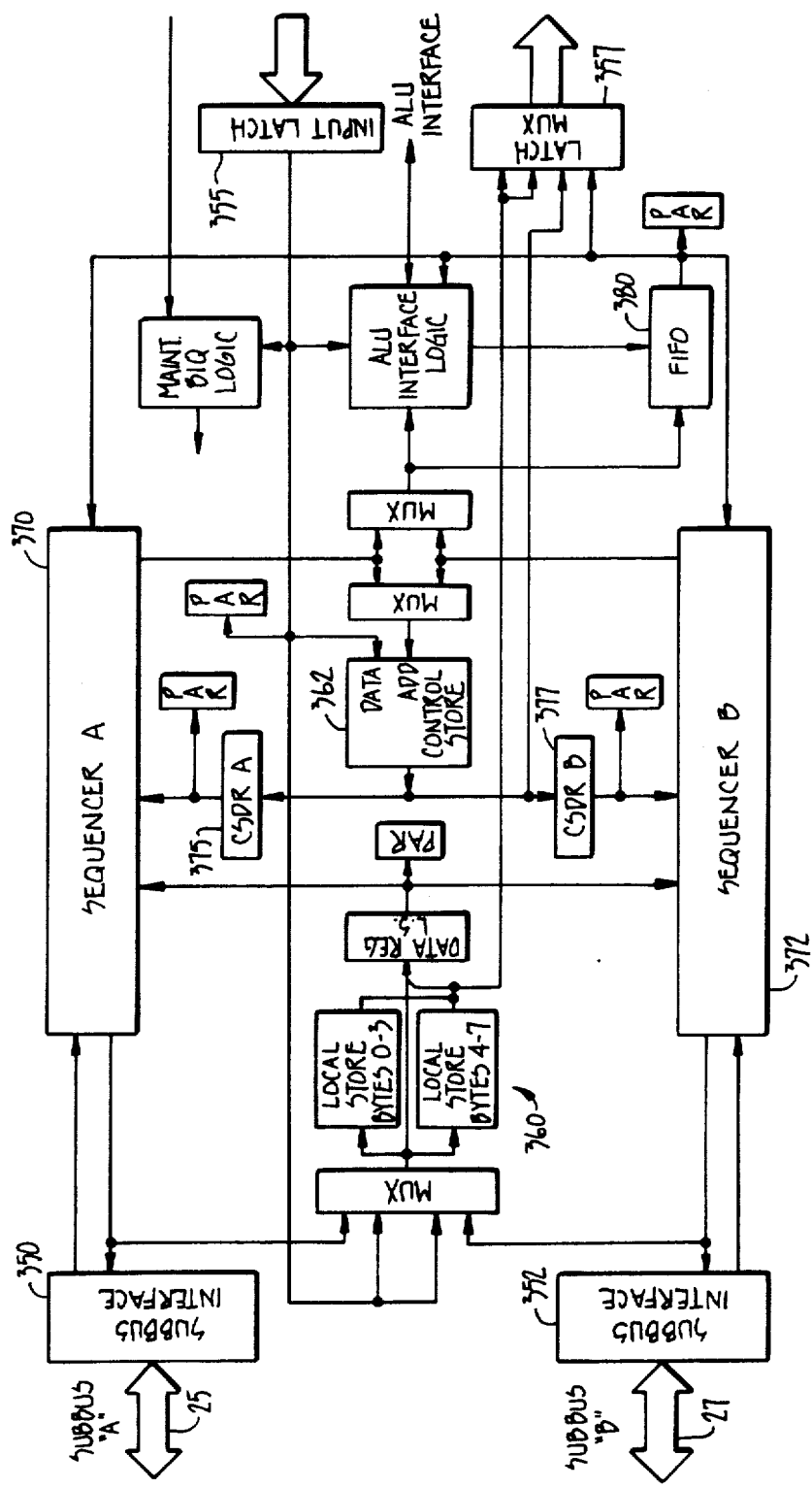
FIG._24.

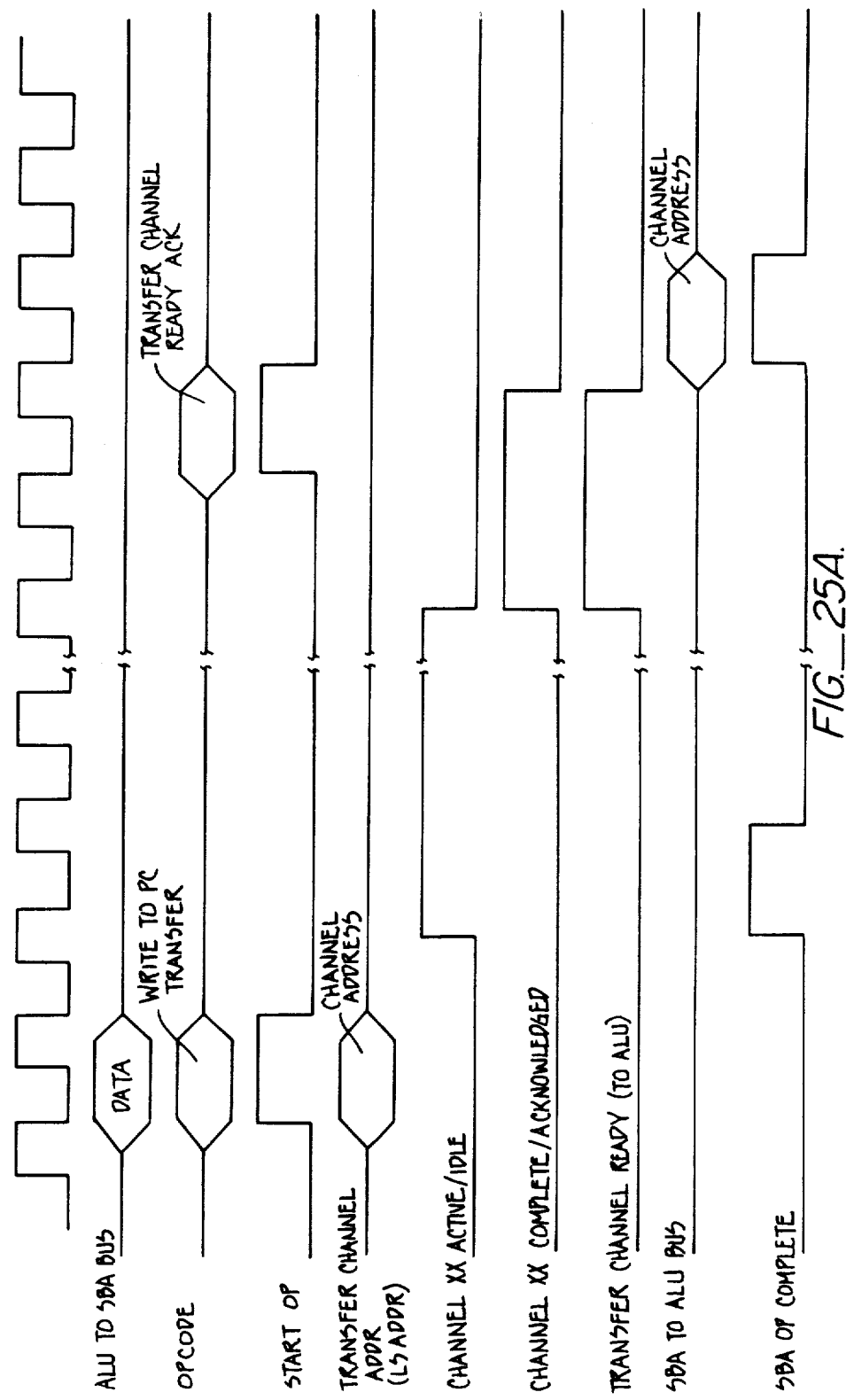
FIG._25A.

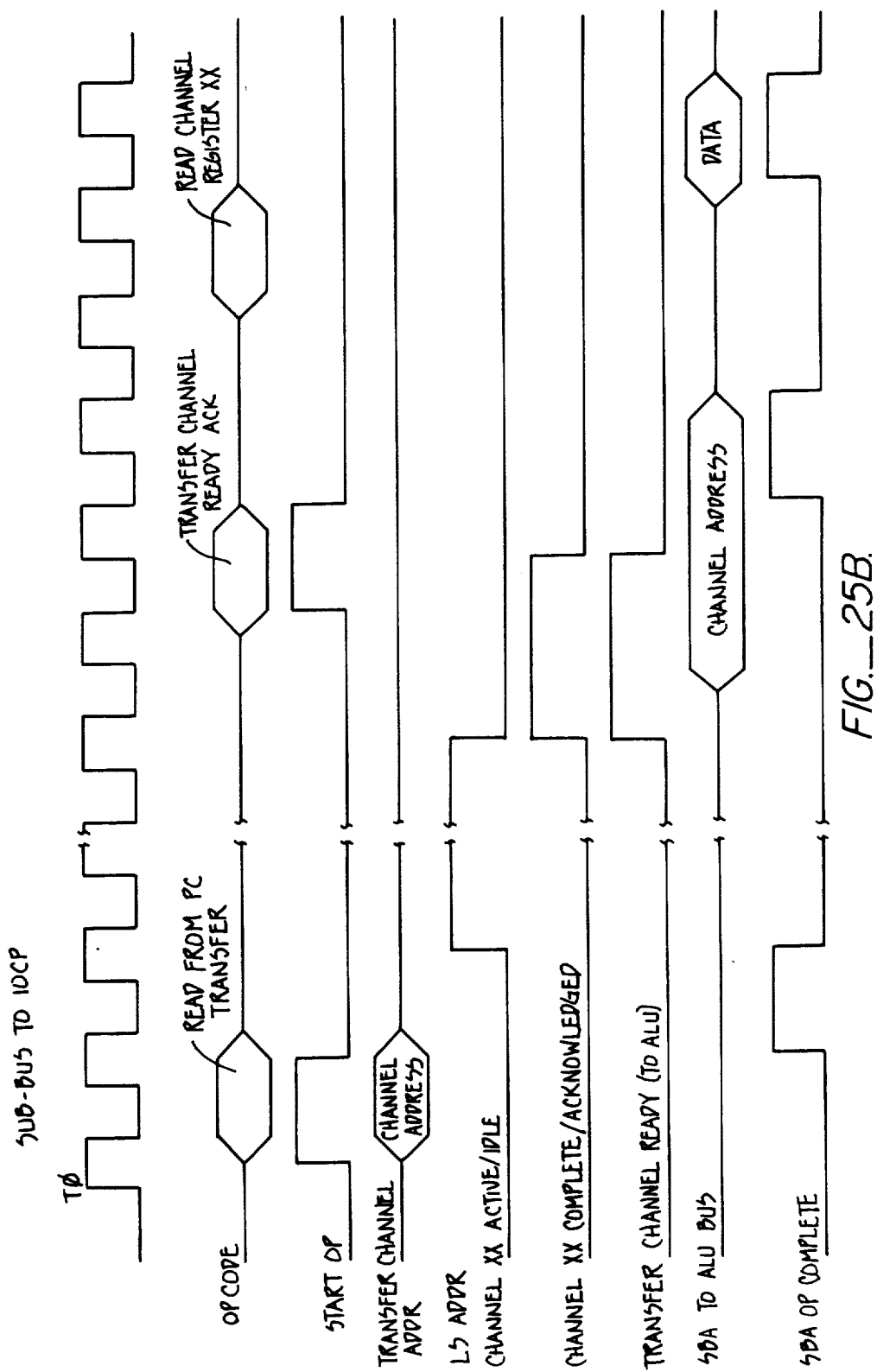
FIG._25B.

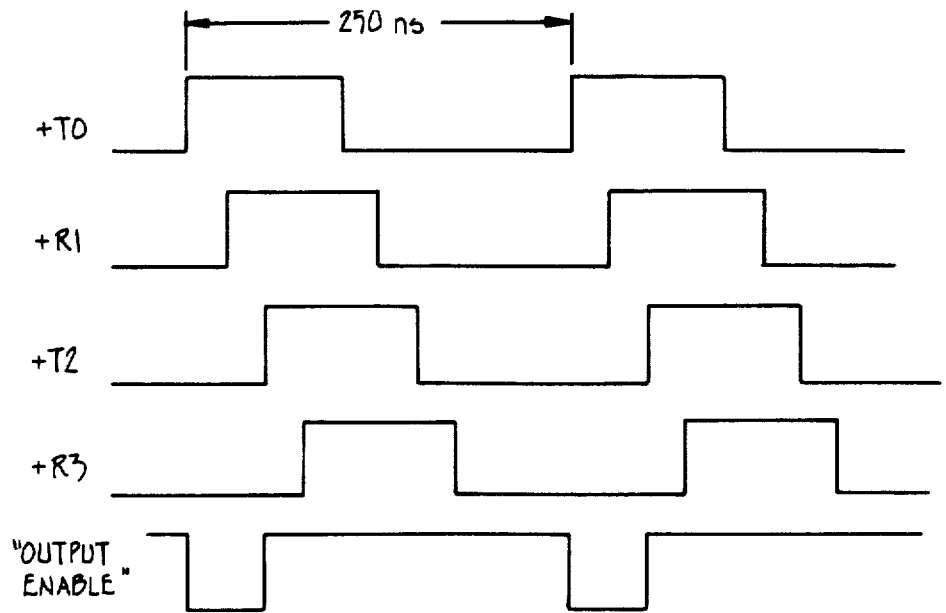
FIG._27.
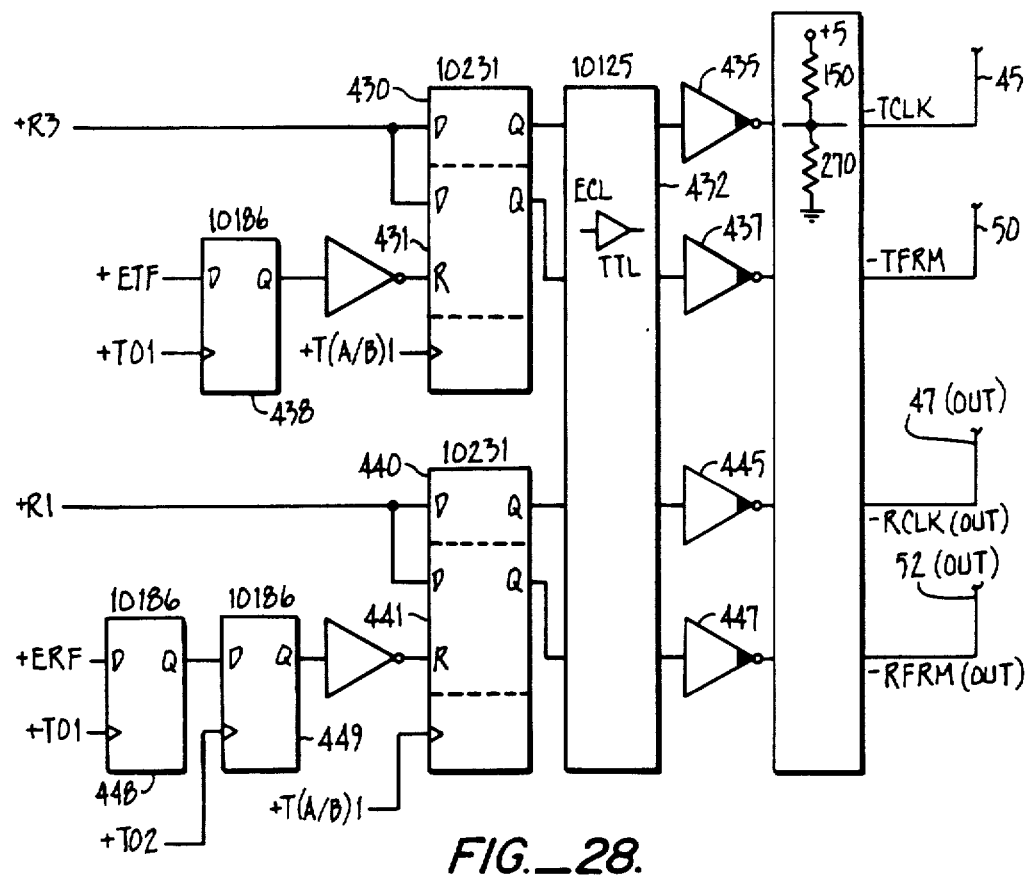
FIG._28.

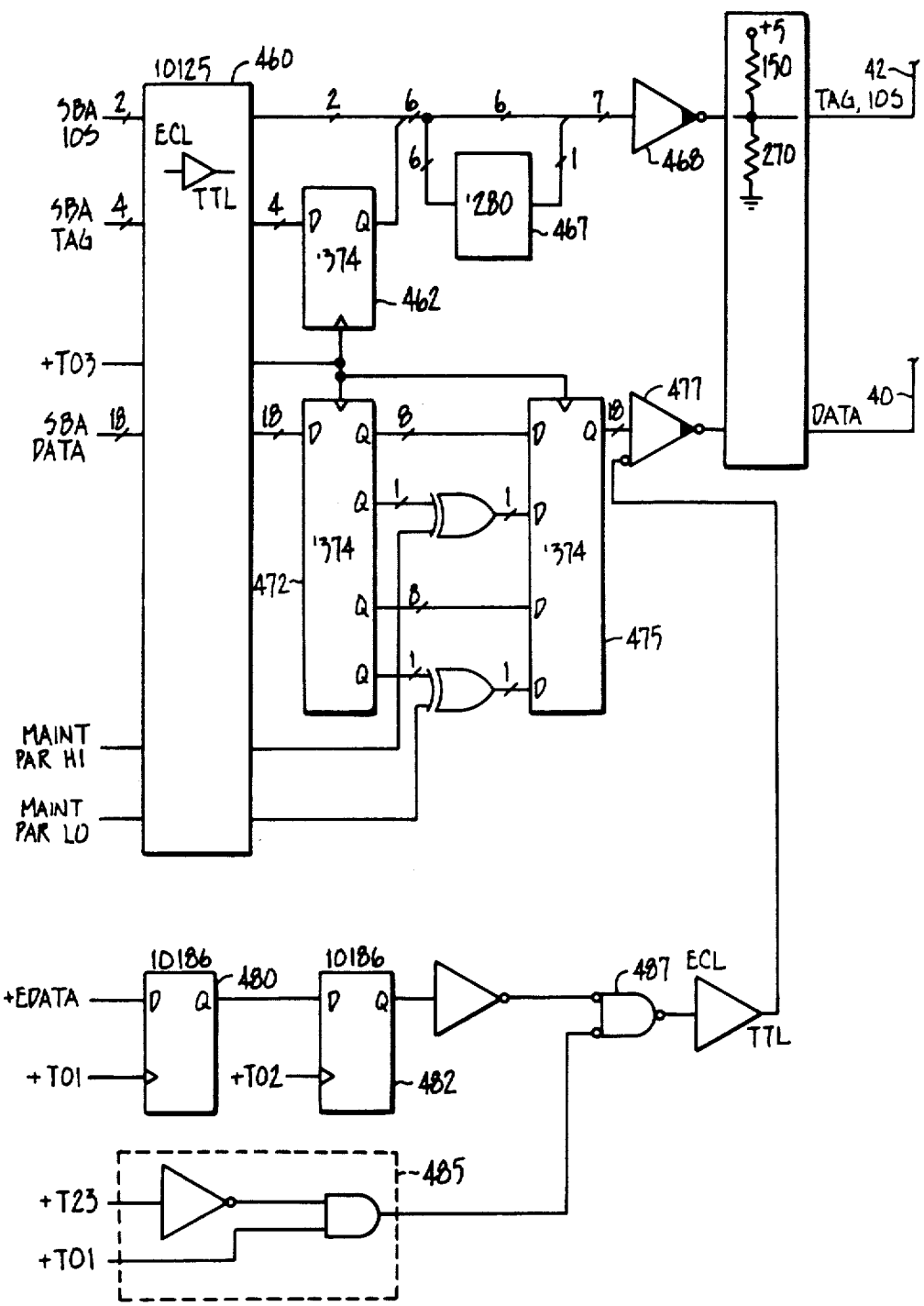
FIG._29.

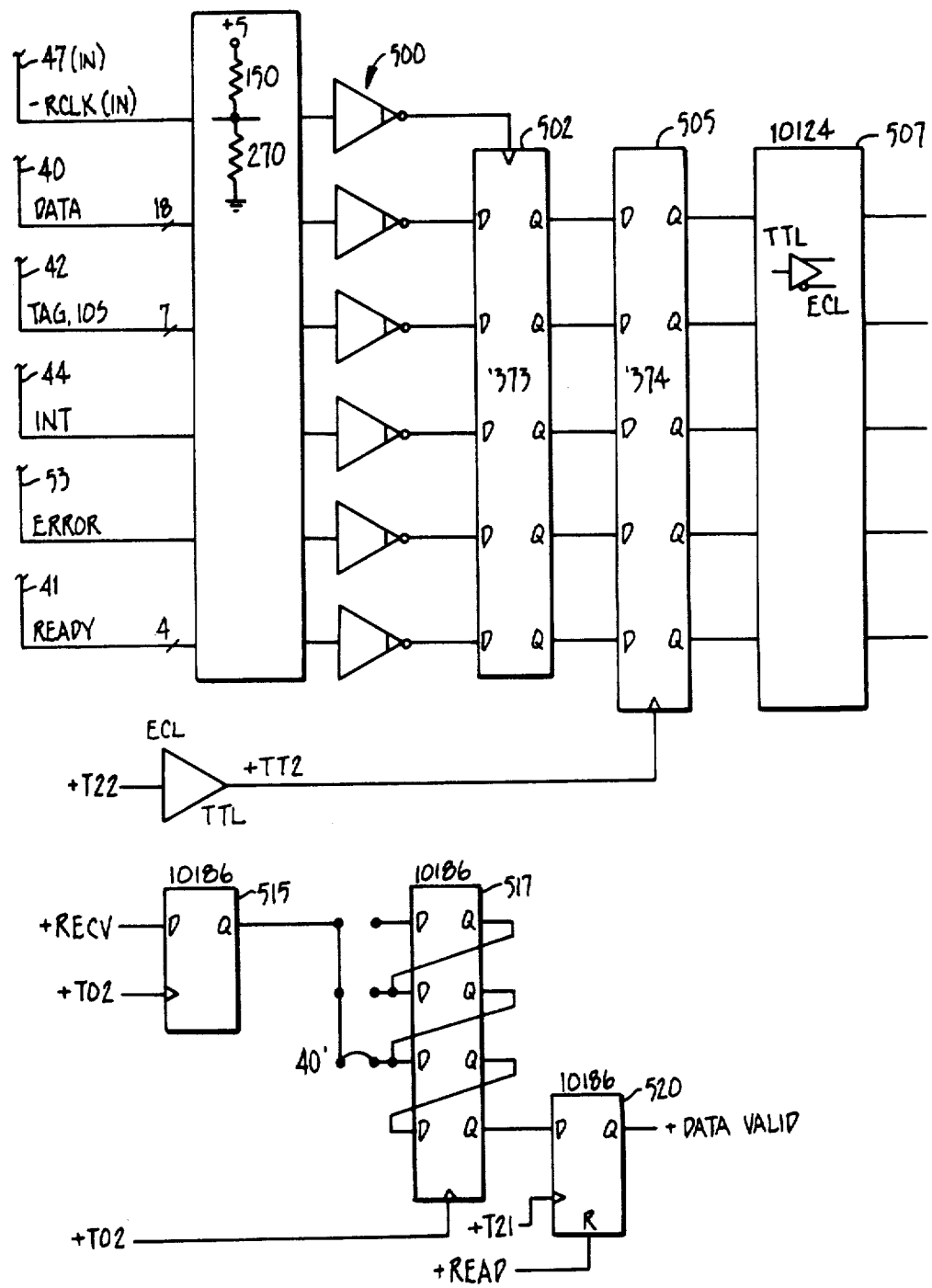
FIG._30.

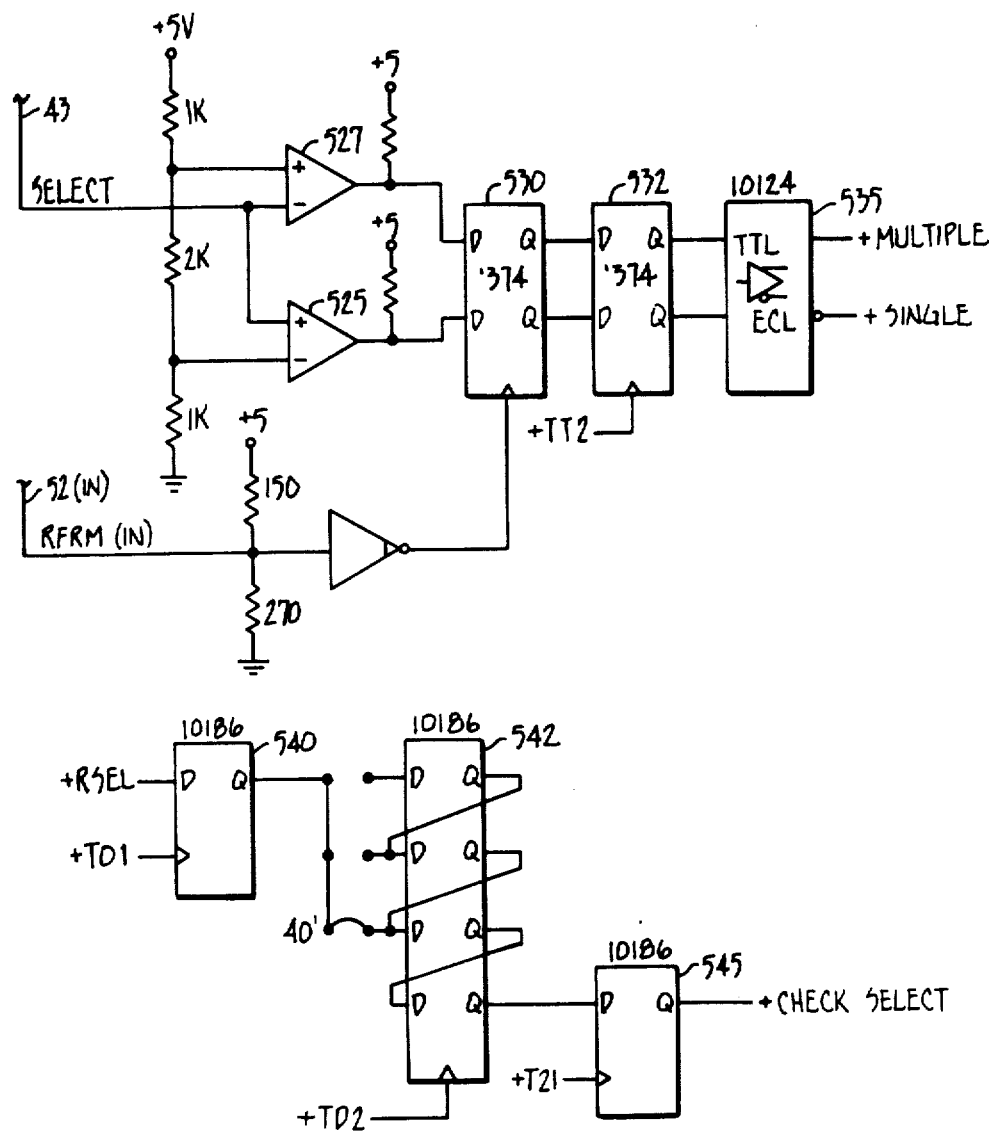
FIG._31.

I/O CHANNEL BUS

FIELD OF THE INVENTION

This invention relates generally to data processing systems, and more specifically to a sub-bus system through which a plurality of peripheral controllers may communicate with other functional units in the overall system.

BACKGROUND OF THE INVENTION

A typical computer system includes a number of peripheral devices (hereinafter often referred to as "peripherals" or "devices") that provide mass storage for the system and allow communication outside the system. These peripherals include disk drives, tape drives, terminals, and the like. However, the peripherals typically operate on a time scale that is at least an order of magnitude slower than the operation of other functional units within the system. While it is a known practice to interface peripheral controllers directly to a main system bus, this typically requires a large amount of overhead associated with each peripheral controller. Accordingly, it is a known practice to couple the peripheral controllers to a peripheral sub-bus, and to provide an intelligent I/O channel processor (hereinafter "IOCP") for controlling communication between the sub-bus and the main system bus. To simplify terminology, the peripheral sub-bus will often be referred to simply as the "bus." Directions on the bus will be designated relative to the IOCP, with terms such as "transmit" and "outbound" referring to communications from the IOCP and terms such as "receive" and "inbound" referring to communications to the IOCP.

Once a bus has been dedicated to the peripheral devices, it becomes a major concern that the bus resources be fully utilized and allocated among the various peripherals in manner that permits reasonable bus access to all the peripherals. The prior art has utilized a number of schemes in attempts to divide up the bus resources. The simplest prior art scheme effects a sequential allocation wherein each requesting device is assigned complete use of the bus and allowed to complete its data transfer at the maximum bus rate or maximum device rate, whichever is slower, prior to relinquishing the bus to the next requesting device. The next step up in complexity involves prioritizing specific devices or grouping bus traffic by direction in cases of physically long buses where turnaround times are large. More sophisticated prior art systems implement a form of time sharing which allocates time slots to requesting devices. Such systems suffer from the problem that a given device may be evicted at the end of a time slot, even if it has not completed its transfer, thus requiring that a transfer continue in some future time slot. While the transfer will eventually be completed, such eviction imposes unreasonable limitations on the effective device speed.

While an addressing scheme is a necessary feature of any bus system, considerable care must be taken to make sure that such a scheme does not unduly increase the bus cost or decrease the bus speed. Generally, addresses are responsible for identification of the data destination, including both the specific device as well as the actual data location within it. The most common prior art system adds separate address lines to the bus and assigns them to the addressing function. This adds to the cost of the bus medium but offers the ability to select individual addresses for each bus operation.

Other systems transmit address information on the data bus in a time shared manner. This typically requires extensive control to ensure that the additional burden on the data section does not slow the entire bus down. One way of minimizing the burden imposed by having to time share the data bus is to require that once a group of bus cycles is allocated to an address, the entire transfer be completed on subsequent cycles. However, this tends to freeze out short transfers while the long ones are being completed. Moreover, where the device speed is slow relative to the bus, the bus is prevented from running at its own (faster) rate.

An additional set of complications arise when attempts are made to operate a bus bi-directionally. Data buses are characterized as to whether they can transfer data in one direction (simplex), in both directions at different times (half duplex), or in both directions simultaneously (full duplex). True full duplex operation is obtainable only with two separate data paths, one for each direction, and requires two sets of control lines. The alternative, a single bi-directional data path that is controlled in such a fashion as to seem full in nature, requires the control system to handle multiple interleaved operations in different directions in such a manner as to make them appear simultaneous. However, for buses with this ability to interleave operations, time sharing becomes increasingly complicated as the address information also needs to be interleaved.

Thus, attempts to render flexible and efficient the allocation of bus resources have been met with undesirable increases in overhead.

SUMMARY OF THE INVENTION

The present invention provides a very fast bidirectional data bus system that makes highly efficient use of both the bus medium and bandwidth.

Broadly, the invention utilizes a set of tag lines separate from the bi-directional data lines to implement a system of logical transfer channels. There are a relatively small number of transfer channels (say four) that may be attached or detached by the IOCP to meet the data flow requirements. The system of logical transfer channels provides high data rates (even over long distances) and good error detection. The basic function of a transfer channel is to enable temporary assignment of some portion of the bus resource to a specific device and then to allow simple, quick addressing of that device by reference to that channel.

For a transfer to occur between the IOCP and a device, the IOCP first effects an "attach" operation to assign the device a transfer channel for the duration of the transfer. Thereafter, the IOCP allocates the bus cycles among the currently attached transfer channels according to any desired priority scheme, subject to the constraint that the device on a transfer channel be ready to send or receive data before that transfer channel may be granted cycles. In one embodiment, all the devices are connected to a plurality of "channel ready" lines corresponding to the plurality of transfer channels. The IOCP effects the attach operation by direct addressing of the device to give it the channel number and to establish a base address for sequential accesses within the device. Thereafter, the device requests bus cycles by asserting the appropriate channel ready line. The IOCP responds by placing the binary code responding to the requesting device's transfer channel on the tag lines, signifying that the next bus operation will be a data transfer with respect to that channel. In the event that a device is capable of operating at or beyond the bus data rate, the device may be assumed ready at all times. Such a device need not be connected to the "channel ready" lines, so long as the IOCP knows that such a device, once assigned a transfer channel, is always ready to send or receive data.

Data transfers occur in units (or "bursts") of a predetermined number of bus words (for example, four 16-bit words). Each bus interface includes a staging area to contain or receive four words in sequence so that these words may be transferred on or off the bus at the maximum bus speed regardless of the speed of the device. The device only asserts the channel ready line when it has four words in its staging registers and is thus ready to transmit, or has its staging registers empty and is thus ready to receive.

During a bus operation that has been defined to be a data transfer by the previous tag, four words are moved to or from the device at the maximum speed of the bus. Data transfers longer than the four-word data unit occur over a series of such four-cycle bursts. In general, other transfer channels may have been allocated four-cycle blocks in the interim. At the end of a data transfer, the channel is detached from the device and made available to other devices.

The system of logical transfer channels allows each device to run at its own speed during transfers while allowing the bus to run at its maximum speed. Since the data direction is established during the attach operation, the direction is thereafter implied by the IOCP's issuance of tags, representing a further reduction in control overhead. The system provides a simple priority scheme by allowing the channel tags to be given in any order, and provides needed flexibility and time sharing through the use of the same mechanisms. Multiple, simultaneous transfers are easily interleaved through the use of the transfer channels, without requiring any complicated overhead to interleave the addresses.

The invention thus operates according to a synchronous pipelined control sequence initiated by the IOCP with the tag used by all controllers to define activities for the next cycle. This differs from the most common asynchronous type of bus structure that relies on the exchange of "handshake" signals on the bus to execute and monitor the progress of an exchange of information. While it is a simple task to monitor the sequence of handshake signals in an asynchronous system, many such systems cannot distinguish between single and plural units since the sequence of the handshake signals would appear correct in either case.

The present invention provides selection circuitry to allow the IOCP to determine whether a sequence is proceeding properly. The selection circuitry comprises a signal source at each device, a monitor at the IOCP, and a common select line to which the sources and monitor are coupled. The signal source includes elements responsive to the tag and timing signals, and a constant current source coupled to the select line. The monitor at the IOCP includes a tag decoder and a voltage reference. At the beginning of each bus transaction, all devices examine the tag information to determine if the specified tag is unique to an individual device. If a device determines that it is being addressed uniquely, it conditions its current source to control the select line. This causes a predetermined amount of current to flow, thus allowing the IOCP to distinguish the situation of no controllers, a single controller, and multiple controllers being selected. As the IOCP issues tags on the tag lines, it maintains a pipeline of expected responses for the selection signals. A disagreement between the actual and expected conditions of the select lines signifies a selection error.

Since multiple selection conveys no information as to which devices on the bus were selected, or how many were erroneously selected, the selection circuitry further includes a history shift register in each device. At the time a device determines how to condition its current source, it also places a code representative of this determination in its history shift register. When the IOCP detects an error condition, it issues a global tag, designated the "lock" tag, that causes all controllers to freeze the state of their selection history registers to enable the IOCP to determine the source of the error. Reading the history register causes it to unlock so that it may begin again to reflect the true selection history of the device with respect to tags on the bus.

For a further understanding of the nature and advantages of the present invention, reference should be made to the remaining portions of the specification and the attached drawings.

BRIEF DESCRIPTION OF THE DRAWINGS

FIG. 1 is an overall block diagram of a computer system illustrating the I/O channel bus;

FIG. 2A is a block diagram of one of the peripheral controller front ends;

FIG. 2B is a block diagram illustrating the manner in which the controller front ends are coupled to the I/O channel bus;

FIG. 3 is a timing diagram of the clock signals at the IOCP;

FIG. 4 is a schematic of the clock input circuitry within a peripheral controller port;

FIG. 5 is a timing diagram of clock signals at the port;

FIG. 6A is a schematic of the input and data staging circuitry within the port;

FIG. 6B is a schematic of the output circuitry within the port;

FIG. 7 is a schematic of the tag decoding circuitry within the port;

FIG. 8 is a schematic of the circuitry within the port for identifying register operations;

FIG. 9 is a timing diagram of the register write signals;

FIG. 10 is a schematic of the port's attention register;

FIG. 11 is a schematic of the port's pointer register;

FIG. 12 is a schematic of the port's activity register;

FIG. 13 is a schematic of the port's DMA address and control registers;

FIG. 14 is a schematic of the circuitry within the port for driving the ready bus;

FIG. 15 is a schematic of the circuitry within the port for driving the select line;

FIG. 16 is a schematic of the port's status register;

FIG. 17 is a schematic of the circuitry within the port for driving the error line;

FIG. 18 is a schematic of the circuitry within the port for decoding the mask;

FIG. 19 is a schematic of the port's end status register;

FIG. 20 is a schematic of the port's wrap registers;

FIG. 21 is a schematic of the port's side control register;

FIG. 22 is a schematic of circuitry withing the port for initiating extended mode operation;

FIG. 23 is a schematic of maintenance control circuitry that is shared between the two ports in a controller front end;

FIG. 24 is a block diagram of the SBA;

FIGS. 25A and 25B are timing diagrams illustrating the sequence of signals between the SBA and the IOCP's ALU;

FIG. 26 is a schematic of clock distribution circuitry in the SBA;

FIG. 27 is a timing diagram of clock signals in the SBA;

FIG. 28 is a schematic of clock driving circuitry within an SBA sub-bus interface;

FIG. 29 is a schematic of data and tag output circuitry within the SBA sub-bus interface;

FIG. 30 is a schematic of input circuitry within the SBA sub-bus interface; and

FIG. 31 is a schematic of circuitry within the SBA sub-bus interface for sensing the select line.

DESCRIPTION OF THE PREFERRED EMBODIMENT

Overview

FIG. 1 is a block diagram of a representative computer system on which the present invention may be implemented. Broadly, the computer system comprises a central processing unit (CPU) 10, a service processor (SVP) 12, a memory controller (MC) 13, and an I/O channel processor (IOCP) 15, all of which communicate on a system bus 17 with bus arbitration being carried out by a bus control unit (BCU) 18. CPU 10 includes a cache/TLB (translation lookaside buffer) and an arithmetic logical unit (ALU), and further communicates with a floating point accelerator (FPA). Service processor 12 is used for initialization and reconfiguration of the computer system. Memory controller 13 communicates with memory units. IOCP 15 includes a cache/TLB 20, an ALU 22, and a sub-bus adaptor (SBA) 23.

SBA 23 is coupled to two I/O sub-buses 25 and 27, and communicates via one or both of the sub-buses with a plurality of peripherals, 30a and 30b being shown. The peripherals are spatially distributed over a significant area so that sub-buses 25 and 27 are relatively long (perhaps 50' or 100'), extending to respective terminator units 31 and 32. Each peripheral includes a device 33 (which may be a tape drive, a disk drive, or the like), an appropriate device controller 34, and a controller front end (sometimes called a "CFE") 35 which communicates with controller 34 via a set of data and control lines 36.

In the preferred embodiment, controller front end 35 has two ports 37 (sometimes referred to as the A and B ports) which couple to respective sub-buses. In the case of peripheral 30a, ports 37 are coupled to sub-buses 25 and 27, but this is not necessary. To illustrate this, peripheral 30b is shown as having one of its ports coupled to sub-bus 25 and the other coupled to a sub-bus 27' from another IOCP (not shown). In the preferred embodiment up to sixteen ports may be coupled to a given sub-bus. Each port is provided with switches to allow the unit number to be defined.

FIG. 2A is a block diagram illustrating the major components and communication paths within controller front end 35. Only one port is shown. As can be seen, each port includes clock receiving circuitry, data handling circuitry, control circuitry, and a variety of registers. Controller front end 35 also includes control circuitry common to both ports. The controller front ends are implemented in TTL logic; the particular structure and operation of the various components will be described in detail below with reference to various circuit schematics. The circuit schematics are drawn in a somewhat simplified format. Part numbers are shown in an abbreviated notation with an apostrophe signifying the omission of the family designator "74S." Also, multiple parallel devices are shown as single devices.

While the nature of an individual device controller 34 will depend on the nature of the device or devices with which it communicates, the controller front end 35 is the same for all peripherals. It is assumed that controller 34 includes sufficient intelligence and appropriate interface circuitry to communicate on lines 36.

The present invention relates to the manner in which bus cycles on sub-buses 25 and 27 are allocated among the devices in order to optimize bus utilization. For the purposes of the following discussion, sub-buses 25 and 27 may be considered substantially the same, and further, the two ports within a given controller front end 35 may be considered the same. Accordingly, much of the discussion that follows will be in terms of a single sub-bus and a single port within controller front end 35. Moreover, a given sub-bus will usually be referred to simply as a "bus" except when required to distinguish it from system bus 17.

FIG. 2B is a schematic illustrating the signal paths on which data, control signals, and timing signals are communicated between SBA 23 and controller front end 35. To simplify the explanation, only sub-bus 25 ("bus 25") and one port 37 are shown.

Bus 25 includes a data bus 40, a ready bus 41, a tag bus 42, a select line 43, an interrupt line 44, a first clock line 45 (TCLK), a second clock line 47 (RCLK), a first frame line 50 (TFRM), a second frame line 52 (RFRM), and an error line 53. All the signals on bus 25 (except select) are driven and received by 26S10 open collector quad bus transceivers.

Data bus 40 includes lines for sixteen data bits and two parity bits. The parity bits are used to maintain an odd number of bits in each of two groups of eight data bits. In general, the parity of the data bus will be correct, although there are some conditions in which the parity cannot be properly controlled, such as during the poll activity data response cycle to be discussed below.

Ready bus 41 includes four lines which correspond to four logical transfer channels. A device operating in the block transfer mode may be attached to any one of the four transfer channels. When an attached device is ready to transfer a 4-word burst on four consecutive cycles, it activates the appropriate ready line. The IOCP responds to the request by issuing an appropriate tag to grant that transfer channel four consecutive bus cycles sufficient for the burst. A device that is capable of moving data faster than the bus rate need not use ready bus 41, but rather may be assumed by the IOCP to be ready.

Tag bus 42 includes four tag lines, two I/O status (IOS) lines, and a parity line, and is used to define bus operations. The tag field is used primarily to define the next bus cycle, but also has extended uses as defined by the IOS bits.

Select line 43 is controlled by any unit which is involved with a bus cycle, and thus provides an indication whether no units, one unit, or more than one unit has been selected.

Interrupt line 44 may be driven by any device that both has its activity bit set and is allowed to interrupt based on a previously distributed mask. The interrupt line is not used for data transfer (that is the function of ready bus 41), but rather is used to initiate a communication, that is, to start a transfer. The state of the line tells the IOCP that some device needs service. The IOCP uses the poll activity tag to determine which device.

Error line 53 is driven by any device at any time to inform the IOCP that something is broken. Whenever a controller detects a hardware failure that would inhibit it from proper functioning, it asserts the error line and provides error information in its own status register. In response to the error signal, the IOCP can determine which device on the bus has a problem by reading each device's status register.

Data bus 40 is bi-directional in that it may be driven either by SBA 23 or by port 37. Tag bus 42, on the other hand, is only driven by SBA 23. Ready bus 41, select line 43, interrupt line 44, and error line 53 are driven by the ports. The above lines are resistively terminated at terminator unit 31.

TCLK line 45 and TFRM line 50 are driven by SBA 23 and extend to terminator unit 31 where they are resistively terminated.

RCLK line 47 comprises a pair of segments 47(out) and 47(in) which are connected at terminator unit 31. The RCLK signal is driven by SBA 23 on segment 47(out), propagates away from the SBA toward terminator unit 31 where it is turned around and propagates back toward SBA 23 along segment 47(in). Segment 47(in) is resistively terminated at SBA 23. Port 37 is coupled to RCLK segment 47(in), but not segment 47(out).

RFRM line 52 similarly comprises a pair of segments 52(out) and 52(in) which are connected at terminator unit 31 with port 37 being coupled to RFRM segment 52(in).

The primary function of the peripheral system is to move data, and as such, the most basic mode of operation is the block data transfer mode. Four interleaved data transfers (corresponding to four logical transfer channels) may be supported on each sub-bus. Once a data transfer to or from a device has been initialized, the device activates the appropriate ready line to signify that it is ready to transfer data. The state of tag bus 42 is interpreted by the controller front ends as defining what is to occur on the following bus cycle, and tells the ready device when it is to be granted bus cycles.

Data transfers on the bus occur in 4-word units or bursts, each of which occupies the bus for four successive bus cycles. There is no intrinsic significance to this number except that the sub-bus handles 16-bit words while system bus 17 handles 64-bit words.

The other basic mode is the register transfer in which the IOCP writes into or reads from one of several registers in a device. The significance of the particular registers will be described later, it sufficing for the moment to note that these registers provide a variety of control and status information. Various register operations must take place before a device is assigned a transfer channel.

Basic Timing and CFE Clock Receiving Circuitry

FIG. 3 is a timing diagram of the TFRM, TCLK, RFRM, and RCLK signals as generated at SBA 23. In the preferred embodiment, the sub-bus cycle is 250 ns (by way of comparison, system bus 17 operates with a 25-ns cycle).

TCLK is a continuous stream of pulses with leading edges at 250 ns intervals to define the bus cycles and time transfers from the IOCP to the device. The TCLK pulses are 100 ns in duration. For definiteness consider a data transfer that is to occur having the cycles designated N, N+1, N+2, and N+3. TFRM is asserted for 100 ns substantially coincident with the TCLK pulse of the bus cycle (N−1) immediately preceding the first cycle of the 4-cycle transfer. TFRM is not asserted again (to signify a new bus operation) until RFRM has cleared the bus. TCLK runs continuously to time transfers from the IOCP to the device.

SBA 23 places data on the bus at a leading edge of TCLK while the port logic latches the data on the bus at the trailing edge of TCLK (points A, B, C, D). The SBA keeps the data on the bus for a length of time that extends some interval (say 50 ns) beyond the 100 ns TCLK pulse width.

RCLK runs continuously at the same rate as TCLK to time transfers from the device to the IOCP. The leading edge of the RCLK pulses lags the trailing edge of the TCLK pulses by a 100-ns interval. RFRM is asserted for 100 ns substantially coincident with the next RCLK pulse following the assertion of TFRM. The relative timing between (TCLK, TFRM) and (RCLK, RFRM) differs for devices distributed along the bus, since the TFRM and TCLK signals are communicated to the devices directly while the RFRM and RCLK signals must be turned around at terminator unit 31. More particularly, the relative timing is substantially as shown for a device that is located near the terminator unit but the relative delay increases for a device that is located between the IOCP and the terminator. The lag of 100 ns (or more) between the trailing edge of TCLK and the leading edge of RCLK is needed to allow the device most remote from the IOCP enough time to ascertain that it is to place data on the bus and generate the appropriate control signals. The port logic places the first data word on the bus at the leading edge of the RFRM (point A') and removes the last data word slightly after the trailing edge of the 4th RCLK (point B'). SBA 23 latches the data at the trailing edge of RCLK (points A", B", C", and D").

The timing of a register transfer is roughly analogous to that of a data transfer, except that it only occupies data bus 40 for two bus cycles, say cycles N and N+1. Cycle N−1 is the tag cycle which signifies that the following two cycles are to be dedicated to a bus operation. Cycle N is the ID cycle during which the unit number, the register number, and the direction of the register transfer are placed on the data bus. Cycle N+1 is the cycle during which the data is read from or written into the register previously identified.

The significance of the TCLK, TFRM, RCLK, and RFRM signals may now be understood and discussed with reference to a number of hypothetical configurations. As discussed in the introducing portion of this specification, a single clock signal, corresponding to TCLK, would suffice for timing data movements in both directions on data bus 40, were it not for the fact that bus 25 is physically long so that signal propagation times are comparable to or greater than the bus cycle time. Consider a simple case where the device clocks data into its buffers at a predetermined point in a first clock cycle, and places response data onto the bus at another predetermined point in the following bus cycle.

The IOCP expects to latch this response data at a predetermined time in that following bus cycle. However, where the bus is physically long, the IOCP may see that following bus cycle before the response data has propagated back to the IOCP. The RCLK signal overcomes part of this problem since each device latches the bus data at a predetermined time relative to TCLK (trailing edge), and places its response data on the bus at a predetermined time relative to RCLK (leading edge).

Propagation delays can still result in cycle identification confusion. Consider a situation when more than one clock signal is propagating on both the RCLK and TCLK lines. For a device at the far end of the bus (near terminator unit 31), TCLK and RCLK are in almost the same phase relationship as they are at the IOCP. They are simply delayed by the one-way propagation time along the bus, and there is no confusion. However, for devices closer to the IOCP, TCLK appears earlier and RCLK appears later (since RCLK has to make the round trip). This relative lateness of RCLK does not become a serious problem until RCLK and TCLK have become skewed by more than a cycle. Then, the RCLK that follows TCLK is actually the RCLK of the previous cycle which is still travelling along the inbound RCLK line. This problem may be overcome with by slowing down the clocks or by incorporating a mechanism wherein each device takes into account its position on the bus. Neither alternative is desirable.

The TFRM and RFRM signals solve the cycle misidentification problem in a manner that avoids the above undesirable alternatives. As discussed above, the TFRM and RFRM signals provide variable frame cycles controlled in such fashion as to prevent more than one frame being on the bus at any one time. At the same time, the fixed clock cycles are used to move the data. This system is fully synchronous in nature, with all timing and reference elements being originated by and therefore referenced to the IOCP master clock. This helps to prevent any metastable data state caused by data changing at a time when it is being sampled or evaluated.

FIG. 4 is a circuit schematic of clock receiver circuitry 58 within port 37. TCLK, TFRM, RCLK, and RFRM are communicated to respective receivers 60. The outputs of the TCLK, RCLK, and RFRM receivers are communicated through inverting and noninverting buffers 62 to provide positive and negative local signals, designated ±TC, ±RC, and ±RF. The outputs of the TFRM and TCLK receivers are communicated to AND and NAND gates 63 to provide local signals ±TF that are more precisely synchronized with the ±TC signals. The TCLK receiver output is also passed through a delay circuit 65 to produce a delayed local clock signal −TCD. The −TF signal is gated with −TCD to provide delayed local frame signals ±TFD. FIG. 5 is a timing diagram for the above described local timing signals. Only the positive signal is shown if both positive and negative signals are provided.

CFE—Data Handling Circuitry

FIGS. 6A and 6B, taken together, provide a logical schematic of the data handling circuitry within port 37. This circuitry includes input circuitry 80, input data staging circuitry 82, output data staging circuitry 85, and output circuitry 87. It should be noted that the references to "input" and "output" are opposite to the general convention that directions are denoted relative to the IOCP. As will be described more fully below, for data transfers, the tag decoding circuitry generates signals −XW and −XR, signifying a write to or a read from the device.

Data staging is required since data transfers occur in 4-word bursts that occupy 4-cycle intervals. Therefore, transfers from the IOCP to the device are only allowed to occur when input staging circuitry 82 is prepared to receive four words into its registers. Similarly, transfers from the device to the IOCP are only allowed to occur when output staging circuitry 85 has four words in its registers and is prepared to transfer these words onto the bus on successive bus cycles. The staging circuitry communicates with controller 34 via communication lines 36 which include data lines 90 (XDATA), address lines 92, load and unload lines 93, and parity lines 95. Lines that are shared with the other port are marked with an asterisk.

Data input circuitry 80 includes receivers 100, latches 102, and parity checking circuitry 103. Latches 102 are controlled by the +TC signal to place the data on internal data lines 105, designated LDIN. Latches 102 are transparent until the trailing edge of +TC, at which point LDIN lines 105 are held for the duration of the cycle. The transparency allows the incoming data to be communicated to control circuits for the register operation (to be described below) which are thereby afforded additional time to decode the data.

Input staging circuitry 82 includes an array of 4-by-4 register files 110, the data inputs of which are coupled to LDIN lines 105, and the data outputs of which are coupled to XDATA lines 90.

The loading of register files 110 is controlled and timed by signals derived from TCLK and TFRM. The control circuitry includes a counter 115, the output of which controls the register file input address. The data on LDIN are latched into the register files at the trailing edge of +TC and the counter is incremented at the trailing edge of −TCD. The resetting and incrementing of counter 115 are controlled by flip-flops 117 and 118, the first of which has the control signal −XW as generated by the tag decoding circuitry at its data input and is clocked by the trailing edge of −TFD. In this manner, TFRM (actually −TFD) in combination with the appropriate tag validates the loading of register files 110 while TCLK times the loading. The transfer of data out of register files 110 to the controller is under the control of the controller and occurs in whatever sequence at whatever rate is appropriate for that controller. To this end, one of lines 93 controls the output enable of the register files 110 while address lines 92 control the output address.

Output data staging circuitry 85 includes an array of 4-by-4 register files 120, the data inputs of which are coupled to XDATA lines 90, and the data outputs of which are coupled to lines 122, designated DOUT and POUT.

The transfer of data from the controller into register files 120 is under the control of the controller by means of lines 92 and 93 in analogy to the transfer from register files 110 to the controller.

The output addressing of register files 120 is controlled and timed by signals derived from RCLK and RFRM. The control circuitry includes a counter 125 which is incremented at the trailing edge of +RC. The resetting of counter 125 is controlled by a flip-flop 127 which has the control signal −XR at its data input and is clocked by the leading edge of +RF. A flip-flop 128 with the same clock and data inputs generates a +HOLD signal which is asserted by the leading edge of RF and removed when counter 125 has counted four cycles.

The output on lines 122 is communicated to output circuitry 87 (shown in FIG. 6B) which includes output latches 130 and bus drivers 132. A set of output data lines 133 (designated RDATA) communicates the output data to latches 130. A number of control registers, designated collectively 134, are also coupled to RDATA lines 133. These registers will be described below. The control and timing of the output is somewhat more complicated than the straightforward case of input latches 102. More particularly, latches 130 remain transparent during the transfer (+HOLD asserted). Bus drivers 132 are gated by a signal controlled by flip-flops 135 and 137. Flip-flop 135 is set at the leading edge of +RF, and keeps drivers 132 enabled during the 4-cycle transfer. The +HOLD signal keeps flip-flop 137 reset, but when +HOLD is removed, flip-flop 137 can then be set at the next −RC trailing edge, which closes the gate to the drivers. Thus, the last data word is removed from the bus at the trailing edge of +RC (actually later by some gate delays). Thus, the data at SBA 23 is valid at the trailing edge of RCLK which is slightly earlier.

Tags

As briefly alluded to above, the state of tag bus 42 is used to define the bus activity that is to occur over the next cycle or group of cycles. The tag definitions and control signal mnemonics for the various hexadecimal states of the tag bus are tabulated below.

| Hex Code | Tag Definition | Control Signal |
| --- | --- | --- |
| 0 | no operation | |
| 1 | set mask | −SM |
| 2 | activity poll | −POLL |
| 3 | register operation | −REGOP |
| 4 | lock | −LOCK |
| 5−B | unassigned | |
| C−F | data transfer | −XR, −XW |

The IOS bits are used to further define how the tag bits are to be used by the controller. In the normal mode of operation, both IOS bits are zero (a high level on the actual bus lines), in which case the tag field is interpreted normally according to the table set forth above. The IOS lines provide two extensions where the tag field carries the unit address of the peripheral controller to be affected. One extended mode is used to write into the shared unit control register of the controller front end while the other extended mode is used for enabling the receivers and inhibiting the drivers (that is, "evicting" a port from the sub-bus). Unlike normal operations where the tag defines the activity that is to occur on the following cycle(s), the tag field in the extended modes describes activity that is to happen during the present bus cycle.

FIG. 7 is a schematic of circuitry 150 for decoding the tag and IOS signals present on tag bus 42. The circuitry includes receivers 152, parity checking circuitry 155, and the decoding circuitry proper. A comparator 157 and a decoder 160 decode the tag information during the normal mode, and the results are communicated to flip-flops 165. Flip-flops 165 are clocked on the trailing edge of −TF to provide the control signals tabulated above. This illustrates the manner in which the TFRM signal is used to validate the tag signal. A comparator 166 provides a control signal +OSO indicating that the IOS lines specify an extended mode for the particular unit. This will be discussed below in connection with the shared maintenance controls.

Register Operations

A register operation (tag = 3) provides for transfer of control information on the data bus into or out of one of the port's registers. A register operation occupies the two bus cycles immediately following the cycle in which the tag is issued. These cycles are designated the definition cycle and the register transfer cycle. The data bus carries a unit identification field for the port, a register identification field for the relevant register, and a direction flag during the definition cycle. The data bus carries the register data during the register transfer cycle.

FIG. 8 is a schematic of circuitry that decodes the information that is placed on the bus during the definition cycle to determine the particular register operation that is to be carried out. The circuitry is operable to cause the registers tabulated below to be read from the port onto the bus. Also tabulated are the mnemonics of corresponding control signals generated by the circuitry.

| Register | Control Signal |
| --- | --- |
| wrap other | −RDWRAP.THEM |
| wrap self | −RDWRAP.US |
| type | −RDTYPE |
| pointer | −RDPTR |
| status | −RDERR |

The circuitry of FIG. 8 is also operable to cause the following registers to be loaded from the bus.

| Register | Control Signal |
| --- | --- |
| DMA address and control | −XLDLO/−XLDHI |
| attention | −WATTN |
| end status | −WESTAT |
| side control | −WCTL |

During the definition cycle, all devices on the bus scan the data lines to determine which device is the subject of the register operation. A comparator 170 compares the 4-bit unit identification field of the data bus with the 4-bit UNIT code from the switches. A gating network 172 senses the direction flag on the data bus to determine whether a register is to be read from the IOCP or written into by the IOCP during the following (register data) cycle. Respective decoders 175 and 180 sense the register identification field on the data bus to generate the appropriate control signals for register reads and writes.

The timing of the register operation control signals requires some explanation. First, it should be noted that TFRM is asserted twice during a register operation, namely during the tag cycle and again during the definition cycle. A signal from gating network 172 specifying a register read is clocked on the trailing edge of −TF during the definition cycle to generate a signal −RGR that remains active until the next trailing edge of −TF (that is, until the next bus operation). The particular register read control signal remain asserted for a similar interval.

The timing for the register write control signals is more complicated. A signal −RGW is asserted at the trailing edge of −TF, and is clocked through to a gate 182 on the next leading edge of +TC which is the start of the register transfer cycle. Gate 182 is also controlled by −TCD, so that the gate output goes high at the leading edge of −TCD (50 ns later). This allows a flip-flop 185 to sample the data parity error signal +DPE and clock a low level to enable decoder 180 on the next trailing edge of −TC. The particular register write control signal is then asserted, until −TCD is removed 50 ns later. FIG. 9 shows the timing for these control signals.

CFE—Register and Tag Description

The following will describe the tags that are issued and the registers that are accessed in order to initiate and effect a communication between the IOCP and a subject port over one of the logical transfer channels. The description will be in terms of the circuitry within the controller front end (primarily within the subject port), and it will be assumed that the IOCP has sufficient intelligence to effect the sequence described. The basic sequence of tags and bus operations may be outlined as follows.

1. The IOCP, in a register operation, transfers an active channel word into the port's attention register. The active channel word carries information that indicates to the controller that a communication is to occur.

2. The controller, upon determining that a communication is to occur, constructs a 64-bit mini-message, stores it, and places the 15-bit address of the mini-message in the port's pointer register. This causes an interrupt to occur. The mini-message, which may specify a "receive on channel" or "receive on funnel," includes the 24-bit address of a message space and the buffer length.

3. The IOCP, in order to determine which device(s) is (are) driving the interrupt line, issues a poll tag. The poll tag specifies a global channel operation wherein all controllers respond during the same bus cycle to provide the IOCP with activity status information.

4. The IOCP determines according to any desired priority regime that it will establish communication with a particular port, and, in a register operation, reads that port's pointer register. This removes the interrupt.

5. The IOCP, in order to read the mini-message, attaches a transfer channel by writing into the port's DMA address and control registers. In so doing, the IOCP assigns a transfer channel ID and specifies that the transfer is to be from the controller, starting at the address that the IOCP had previously read from to pointer register.

6. The controller loads output staging register files 120 with the four words starting at the address that the IOCP had loaded into the DMA address register (that is, it loads the mini-message). Once this had been done, the controller causes the port to assert the ready line corresponding to the attached transfer channel.

7. The IOCP issues a data transfer tag corresponding to the attached transfer channel. During the following four cycles, the controller clocks the contents of register files 120 onto the data bus as described in the portion relating to the data handling circuitry.

8. The IOCP, having received the mini-message, detaches the transfer channel and proceeds to act on the mini-message.

9. Assuming that a block data transfer is to occur, the IOCP attaches any available transfer channel (not necessarily the transfer channel previously used for the mini-message transfer). In attaching the new transfer channel, the IOCP specifies that the transfer is to be to the controller, starting at the address that had been provided in the mini-message.

10. The controller, in order to receive the communication, clears input staging register files 110, and drives the ready line to signify that four words of the communication may be transferred on the bus during a fourcycle interval.

11. The IOCP, in response to the ready signal, issues a data transfer tag corresponding to the attached transfer channel and places four words of data on the bus during the following four cycles (designated a "burst").

12. Steps 10 and 11 are repeated as often as necessary for the complete data transfer to occur. The transfer channel remains attached but other bus operations will generally occur between the four-cycle blocks.

13. At the completion of the entire transfer, the IOCP writes a completion code into the port's end status register and detaches the transfer channel.

The various registers and supporting circuitry will now be described in the order in which they are called into play during the sequence outlined above. Although the message passing sequence may be different under some circumstances (such as if the transfer is initiated by the device rather than the IOCP), the above sequence illustrates all of the relevant principles. While the sequence of events that occur prior to attaching the transfer channel appears at first glance to represent substantial overhead, it should be remembered that a page of data comprises (in a representative system) 256 8-byte words or 1024 bus words. Thus the set-up cost is relatively trivial compared to the 1024 bus cycles (256 bursts) that will be taken up in the transfer.

FIG. 10 is a schematic of attention register circuitry 200. Broadly, the circuitry communicates the data on LDIN lines 105 to a set of control lines 205 (to the controller) during the register data cycle in response to the −WATTN signal. To this end, the circuitry includes flip-flops 207 having data inputs coupled to LDIN lines 105 and data outputs coupled to control lines 205. Flip-flops 207 are clocked on the trailing edge of −WATTN. The −WATTN signal also sets a flip-flop 208, causing a signal ATTN INT to be communicated to the controller. The output buffers of flip-flops 207 are enabled by a signal RD ATTN from the controller. Flip-flop 208 may be reset by a signal INT CLR from the controller. The actual significance of the active channel word that is clocked onto control lines 205 relates to the overall computer system architecture, and is not part of the present invention. It suffices to note that the active channel word carries information signifying that the IOCP has a message for the controller and desires to establish communication.

FIG. 11 is a schematic of pointer register circuitry 210 and associated circuitry 212 for driving interrupt line 44. Broadly, circuitry 210 communicates the information on control lines 205 to RDATA lines 133 in response to the assertion of −RDPTR and activates interrupt driving circuitry 212. The circuitry includes flip-flops 213 having data inputs coupled to control lines 205 and data outputs coupled to RDATA lines 133. The information on lines 205 is clocked by a signal LDPTR from the controller, but the output buffers of flip-flops 213 are enabled by the assertion of −RDPTR. Assertion of LDPTR by the controller also resets a flip-flop 215 to assert a signal −REQINT. The flip-flop is set to remove −REQINT by the assertion of −RDPTR.

The state of −REQINT is clocked at a trailing edge of −RC by a flip-flop 217 to define the port's activity bit. The activity is gated by a signal −INTA (interrupt allowed) generated by the mask circuitry to be described below. The interrupt signal is clocked through on the leading edge of +RF by a flip-flop 220, and communicated to a bus driver 222 whose output is coupled to interrupt line 44.

FIG. 12 is a schematic of activity register circuitry 230 that provides the information needed by the IOCP to determine which device(s) is (are) driving interrupt line 44. The activity register is actually a pseudoregister in that each port controls only a predetermined one of the data lines. The particular data line controlled is determined by the 4-bit UNIT code. The UNIT code is provided as the address input to a read only memory that generates an active level on the corresponding one of sixteen bits, so long as the activity bit is set. The read only memory is enabled by the assertion of −POLL which, as described above, occurs as a result of the activity poll tag (tag=2). The poll tag is a global channel operation wherein all controllers respond during the same bus cycle by controlling their respective dedicated bits according to the status of their activity bits.

FIG. 13 is a schematic of low order DMA address register circuitry 240, high order DMA address and control register circuitry 242, and common multiplex circuitry 245. Broadly, the DMA control and address registers are loaded during two register write operations. The result is to attach a transfer channel and provide a 24-bit address for the controller hardware as well as a number of control signals.

During the first of the two register operations, the low order DMA address information is loaded into a counter array 250. The load input of counter array 250 is brought low when −XLDLO is asserted, and LDIN lines 105 are loaded at the trailing edge of −XLDLO. The trailing edge of −XLDLO also causes the load input to be brought high, but only after the delay of a flip-flop 252. Thereafter, counter 163 may be incremented by the assertion of a signal COUNT from the controller.

During the second of the two register operations, 8 bits of high order address information are loaded into a counter array 255 in a manner analagous to that described immediately above. Similarly, 8 bits of control information are clocked by a flip-flop 257 (actually, only 5 bits of information are needed in the present embodiment). These include a 2-bit transfer channel code XID, two signals XIN and XOUT utilized by the tag decoding circuitry and the controller, and a signal CHACT indicating that a transfer channel is active. Flip-flop 257 is reset by the assertion of −WESTAT, causing, among other things, the zeroing of XID and CHACT. Since the control signals are generated when the high order address and control information are loaded, it is imperative that the low order information be loaded in the first register operation and the high order information in the second.

The 16-bit output from counter 250 and the 8-bit output from counter 255 are communicated to one set of inputs of multiplexer circuitry 245 while that from the other port are communicated to the other set of inputs. Thus, the controller can select which port it shall take a 24-bit address from.

Once the transfer channel has been attached, the controller determines when to assert the ready line corresponding to the XID of the attached channel.

FIG. 14 is a schematic of circuitry for driving ready bus 41. Upon ascertaining that the appropriate staging registers are ready to send or receive four words on four consecutive bus cycles, the controller asserts a signal BREQ (burst request). The controller operates asynchronously with respect to the bus timing and can assert BREQ at any time relative to the bus clock signals. BREQ is communicated to reset two flip-flops 260 and 262. The resetting of flip-flop 260 causes the assertion of a signal +BRDY which is communicated to the input of a flip-flop 265 and a gate 267. The output of flip-flop 265 is also communicated to gate 267. The gate output enables a selector 268 which provides signals to drive the appropriate line of ready bus 41. These signals are communicated to output flip-flops 270 and ready bus drivers 272. Flip-flop 265 is clocked on a trailing edge of −RC, while output flip-flops 270 are clocked on a leading edge of +RF. Accordingly, even if the +BRDY signal was unstable at the −RC transition, flip-flop 265 will have settled by the next leading edge of +RF, so that the ready bus drivers will not be enabled until BRDY has stabilized. Similarly, when +BRDY is withdrawn, the ready bus will reflect this on the next leading edge of +RF, without having to wait until the trailing edge of −RC.

The IOCP's response to the ready line being driven is to issue a data transfer tag (tag=C, D, E, or F). Tag decoding circuitry 150 responds to the data transfer tags by asserting either −XR or −XW which control the data staging circuitry. The assertion of either of these two signals clocks flip-flop 260, thereby providing a signal BSTART to the controller and withdrawing +BRDY. In a like manner when −XW or −XR is withdrawn, flip-flop 262 is clocked to provide a signal BEND to the controller.

FIG. 15 is a schematic of circuitry for driving select line 43. The signals from the tag decoding circuitry indicative of the grant of bus cycles to the particular port are gated together and communicated to a flip-flop 280 which is clocked on the leading edge of +RF to assert a signal −OURBUS. A current source 282 is coupled through a diode to select line 43. −OURBUS is input to a buffer 285 which sinks the current from source 282 when −OURBUS is not asserted. Assertion of −OURBUS steers the current source to the select line.

Since the data transfer and register operations are unique to a single port on the bus, only one port's current source should drive select line 43 in response to a data transfer tag or a register operation. Multiple selection would signify an error condition which the IOCP could determine.

FIG. 16 is a schematic of status register circuitry 290 which includes an 8-bit history shift register 292 and an 8-bit error buffer 293 which may be read out by the assertion of −RDERR in a register operation. History register 292 receives +OURBUS at its data input and is clocked on the trailing edge of −RF. A flip-flop 295 is set when the tag decoding circuitry asserts −LOCK, causing shift register 292 to be "frozen." The lock tag (tag=4) is a global tag that does not use the data bus, but rather causes all the ports on the bus to freeze their history shift registers. This allows the IOCP to read, on successive register operations, the status registers of all the ports to determine which port was driving the select line when it should not have been. Upon the assertion of −RDERR in a given port, the history shift register for that port is "unfrozen."

FIG. 17 is a schematic of circuitry 300 that causes error line 53 to be driven. This occurs when the controller asserts any of four unit error signals (UE1-UE4), when tag parity checking circuitry 155 asserts a signal −LTPE (latched tag parity error), when input parity error checking circuitry 103 asserts a signal −LDPE (latched data parity error), or when the output circuitry asserts a signal −LIPE (latched internal parity error). These various signals are also input to buffer 293 in status register circuitry 290.

FIG. 18 is a schematic of circuitry 310 that determines, on the basis of the distributed mask, whether the port shall be allowed to drive interrupt line 44. The set mask tag (tag=1) specifies a global channel operation wherein all controllers are accessed during the same bus cycle following this tag. Each port reads a predetermined one of the data lines, as determined by its UNIT code. Each port sets its activity mask bit as indicated by the related bit on the data bus and thus conditions the assertion of −INTA which is used by circuitry 212 to determine whether it is proper to drive the interrupt line.

FIG. 19 is a schematic of end status register circuitry 320. Broadly, circuitry 320 communicates the information on LDIN lines 105 to control lines 205 in response to the assertion of −WESTAT. The circuitry includes flip-flops 322 having data inputs coupled to LDIN lines 105 and data outputs coupled to control lines 205. Flip-flops 322 are clocked on the trailing edge of −WESTAT. The −WESTAT signal also sets a flip-flop 325, causing a signal DONE to be communicated to the controller. The output buffers of flip-flops 322 are enabled by a signal RD ESTAT from the controller, which signal also resets flip-flop 325. The −WESTAT signal also has the effect of detaching the transfer channel by resetting flip-flop 257. The particular completion code that is written into the end status register provides information relating to the completion status.

In addition to the above-described registers and control circuitry, the controller front end includes additional registers and control circuitry which will not be described in detail since they are generally not used except under abnormal conditions.

FIG. 20 illustrates WRAP registers 330 and 332 which enable the IOCP to read the low order DMA address that is written into a port through that port or through the other port in the front end.

FIG. 21 is a schematic of side control register 335 which allows the IOCP to clear various parity error signals by writing the control register in a register operation.

FIG. 22 is a schematic of circuitry within each port for decoding the IOS lines and asserting signals −F1 and −F2 denoting special functions (extended mode). The IOS lines are communicated to a decoder 336 whose outputs provide the −F1 and −F2 signals. Operation in one of the extended modes (maintenance write for −F2 or "eviction" for −F1) occurs only under special conditions, with especially profound results. Accordingly, there is provided a special timed protocol for ensuring that neither −F1 nor −F2 will be asserted spuriously, as for example during power transitions. To this end, decoder 336 is not enabled until TFRM (actually the ungated signal +RAWTF) has been asserted for a predetermined number of cycles. A chain of counters 337 counts +TC pulses (at 250 ns intervals) and for 12 bits defines a 1-ms interval. The assertion of +RAWTF releases the counter clear (so long as +OSO is asserted) and the counter output is gated with +RAWTF to enable decoder 336 once +RAWTF has been active for 1 ms. A corresponding interval later, the counter output changes, thereby negating −F1 and −F2. The data, IOS, and tag must be valid at this transition for maintenance writes. A signal −THIS allows for selection to be described below.

FIG. 23 is a schematic of shared maintenance control circuitry 340. This circuitry responds to the extended mode signals −F1 and −F2 from both ports (designated −F1.A, −F2.A for port A and −F1.B, −F2.B for port B) in order to allow the IOCP to "evict" a port from one of the sub-buses or to carry out a maintenance operation. Circuitry 340 includes receiver control flip-flops 342a and 342b which provide respective pairs of signals ±IN.A and ±IN.B for controlling the receivers in the respective ports. The circuitry also includes driver control flip-flops 345a and 345b which provide respective pairs of signals ±OUT.A and ±OUT.B for controlling the drivers in the respective ports.

The assertion of −F2 (−F2.A or −F2.B) allows the IOCP to use either of the two data sub-buses to communicate maintenance instructions to control the setting of flip-flops 342a-b and 345a-b. The input data lines from both sub-busses are communicated to a first level of multiplexers 350 which provide for selection from one sub-bus or the other, and a second level of multiplexers 352 which allow the desired port to be affected. The need for two levels of multiplexing arises from the fact that while the IOCP will know which sub-bus the port to be controlled is on, it will not know which port within the controller front end is connected to that sub-bus. The multiplexer selection is effected by the signal −THIS from the A port (−THIS.A).

In a maintenance write, bits (0-2) control the input, bits (4-6) the output. Bits (8-F) are written into flip-flop 355 which defines a maintenance register that provides control signals for the controller itself. Bit (0) active specifies that the input function is to be affected. Bit (1) active specifies that the receiving port is to have its own input function affected, bit (2) active specifies that the other port is to have its input function affected. The output functions are handled analogously. The clocking of the flip-flops occurs when −F2 is withdrawn.

The assertion of −F1 (−F1.A or −F1.B) signifies that the port is to be evicted. This mode does not make use of the data bus and uses the −F1 signals to directly control the flip-flops. More particularly, the assertion of −F1 disables the drivers coupled to the sub-bus and forcibly enables the receivers.

IOCP—General Operation

The above description of the controller front ends sets forth the logic necessary to support the system of logical transfer channels used to transfer blocks of data. As discussed above, a peripheral controller communicates with IOCP 15 by passing structured messages denoted "minimessages." The IOCP reads the minimessages by utilizing the block transfer mechanism described above to determine what operation the controller needs to have performed by the IOCP. Upon completion of the requested operation, the IOCP notifies the controller by writing an appropriately formatted status word into end status register 320.

The description made no assumptions regarding IOCP 15 except that the IOCP had sufficient intelligence to determine that the above-described sequences of commands should be issued and that it had the means for driving and detecting signals on the sub-buses. As outlined above, IOCP 15 includes cache/TLB 20 and ALU 22 which together constitute a CPU capable of performing the supervisor and message-handling tasks that permit the peripherals coupled to the sub-buses to communicate with devices coupled to system bus 17. The design and implementation details of the IOCP's CPU represent matters outside the scope of the invention. It suffices to note that in the preferred implementation, the IOCP's CPU is a 64-bit ECL microprogrammed processor with a 50-ns cycle time.

SBA 23 relates more directly to the invention, and will now be described, albeit at a somewhat lower level of detail. SBA 23 is coupled to a 64-bit interface for communication with the IOCP's CPU. Broadly, SBA 23, when receiving a 64bit word from the IOCP's CPU, breaks that down into 16-bit data and accompanying control information for transmission onto the sub-bus. When receiving 16-bit data from the sub-bus, the SBA assembles the 16-bit data into 64bit words and signals the ALU to retrieve the data.

FIG. 24 is a block diagram of SBA 23. SBA 23 couples to sub-buses 25 and 27 through respective sub-bus interfaces 350 and 352, receives 64bit words (72 bits with parity) from the ALU at an input latch 355, and transmits 64-bit words (72 bits with parity) at an output latch and multiplexer 357. The SBA includes a local store 360 and a control store 362, both of which may be downloaded with information from the ALU.

Local store 360 contains a two-word data buffer for each of the eight transfer channels capable of being supported by the SBA (four on each of the two sub-buses), pointers, channel status words, and a table to provide a priority regime for servicing the transfer channels on each of the two sub-buses. The reason for there being two words dedicated to each transfer channel is that the byte alignment from the sub-bus need not correspond to what the ALU requires.

Associated with sub-bus interfaces 350 and 352 are respective sequencers 370 and 372 and respective control store data registers 375 and 377. The basic function of the sequencers is to transfer the appropriate two bytes from local store 360 to the respective sub-bus interface, or to transfer two bytes from the sub-bus interface to the appropriate location in local store. Sequencers 370 and 372 handle a limited number of commands as specified by the ALU, and relieve the ALU of any tasks associated with timing data movement to and from the sub-buses.

The bits in a word from control store 362 provide the necessary control signals for the operation of the sequencers and the sub-bus interfaces. Control store data registers 375 and 377 are loaded from control store 362 to provide such control signals. Local store 360 and control store 362 are each time sliced on a 50-50 basis with the two sequencers running out of phase with one another. Sequencer 370 and sub-bus interface 350 are referred to as the "A side"; sequencer 372 and sub-bus interface 352 as the "B side." These designations need not correspond to the A and B ports in the controller front ends.

The SBA further includes an 8-deep channel FIFO stack 380 into which are written the transfer channel numbers in the order that they are serviced. With the exception of portions of sub-bus interfaces 350 and 352, the SBA is implemented in ECL logic due to the relatively high speed required.

The data flow and general operation of the SBA may be understood by considering, first, the sequence for a transfer from the ALU onto the sub-bus (as for example to effect a write from memory to disk), and second, the sequence for a transfer from the sub-bus to the ALU (as for example to effect a read from disk to memory).

When the ALU decides to begin a transfer, it communicates to the SBA the direction, the transfer channel address, and a byte offset. The ALU latches a first 64bit word from its cache and makes this available at input latch 355. The ALU provides the channel address and an opcode specifying that the first word is to be written to a peripheral controller.

The SBA stores this first word in the first of the two locations in local store 360 dedicated to this transfer channel, puts the channel address in channel FIFO 380, and asserts a transfer channel ready flag to the ALU. (Note at this time the first word has not been transferred onto the sub-bus.)

The ALU, on seeing the transfer channel ready flag, reads the channel address, and uses this channel address to index a channel control word which specifies, among other things, the amount of data left to transfer. The ALU fetches the next word from its cache, makes it available at latch 355, and provides the SBA with the channel address and an opcode specifying a write to a peripheral controller.

The SBA stores the second word in the second of the two local store locations dedicated to that transfer channel. The SBA causes eight bytes to be transferred on the sub-bus on four successive sub-bus cycles according to the sequence and timing described above. Depending on the byte offset, the eight bytes may come in part or in whole from the first of the two local store locations. After the eight bytes have been transferred, the SBA puts the channel address in channel FIFO 380, and asserts the transfer channel ready flag.

As above, the ALU upon seeing the transfer ready flag, reads the channel address, indexes the channel control word, fetches the next word from its cache, and communicates this word with accompanying control information to the SBA. The SBA stores this next word in the first local store location and transfers eight bytes as described above. On successive transfers, it will store words from the ALU alternating between the first and second locations.

For a transfer from the peripheral to the IOCP, the ALU initiates such a transfer by informing the SBA of the direction, the transfer channel address, the byte offset, and provides the SBA with a transfer channel address and an opcode specifying a read from peripheral controller.

The SBA causes eight bytes to be transferred from the controller on the sub-bus over four successive sub-bus cycles, stores the eight bytes in the first local store location, puts the channel address in the channel FIFO, and asserts the transfer channel ready flag.

The ALU, upon seeing the transfer channel ready flag, reads the channel address, indexes the channel control word, and gives the SBA the transfer channel address and the opcode specifying a read from peripheral controller.

The SBA then effects a transfer of eight more bytes and stores them in the second location in local store 360, puts the channel address in channel FIFO 380, and asserts the transfer channel ready flag.

Upon seeing the channel address at the head of the FIFO, the SBA reads the appropriate eight bytes out of the two locations for that channel, and transfers these eight bytes to output multiplexer 357. The ALU reads the channel address, uses it to index the channel control word, reads the word from output latch 357 and provides it to its cache. The ALU then gives the SBA the transfer channel address and the opcode specifying a read from controller to repeat the above sequence. The SBA alternately stores the eight bytes from the sub-bus in the first and second locations as in the case of the transfer from the IOCP to the controller.

FIGS. 25A and 25B are timing diagrams for control signals passing between the ALU and the SBA, illustrating the sequence of events for the two directions of transfers outlined above. The gaps illustrated in the sequences signify that the 64-bit data transfer on the sub-bus occurs within the interval.

IOCP—Clock Generation

FIG. 26 is a schematic of circuitry within SBA 23 that provides various clock signals for sequencers 370 and 372 and for sub-bus interfaces 350 and 352. The circuitry operates to provide a variety of 50-ns and 250-ns clock signals that establish sub-bus timing. These are derived from the basic 25-ns clock signal that defines overall system timing.

Complementary system clock signals +SYSCLK and −SYSCLK are gated at a network 400 to produce complementary 25-ns clock signals +GCLK and −GCLK. +GCLK is communicated to a counter 402 which provides frequency divided signals, more particularly a 250-ns clock signal +REF0, and a 50-ns clock signal +(A/B). These signals are communicated to two sets of circuitry corresponding to the A and B sides of the SBA. Only one set will be described. The suffix ".A" will denote timing signals for the A side; the suffix ".B" will denote signals for the B side.

REF0 is communicated to a chain of cascaded flip-flop stages 405 which, when clocked by a signal derived from −GCLK, provides a group 407 of 250-ns clock signals. Signals 407 include four subgroups: (+T01.A, +T02.A, +T03.A), +R1.A, (+T21.A, +T22.A, +T23.A), and +R3.A. The subgroups are progressively delayed relative to one another by 25-ns increments. A timing diagram of signal group 407 is shown in FIG. 27.

The 50-ns signal +(A/B) is inverted to define a signal −(A/B).A which is clocked by the same derived −GCLK signal to generate a group 408 of 50-ns clock signals +T(A/B)1.A, −T(A/B)1.A, +T(A/B)3.A. The signal +(A/B) in its non-inverted state is used to establish a complementary set of signals (not shown) for the B side.

FIG. 28 is a schematic of circuitry within sub-bus interface 350 for generating the outbound clock signals, the timing of which is illustrated in FIG. 3. The 250-ns signal +R3 is communicated to the data inputs of flip-flops 430 and 431 which are clocked at 50-ns intervals by +T(A/B)1. The outputs of flip-flops 430 and 431 are passed through ECL/TTL converters 432 and to respective bus drivers 435 and 437 to drive TCLK line 45 and TFRM line 50. As discussed above, TCLK runs continuously while TFRM is only asserted in connection with the issuance of tags. TFRM is controlled by the signal +ETF (enable TFRM) which is one of the bits from control store data register 375. This is effected by having +ETF, as clocked through a flip-flop 438, control the reset input of flip-flop 431.

In a like manner, the 250-ns signal +R1 is communicated to the data inputs of flip-flops 440 and 431, the outputs of which are passed through ECL/TTL converters 432 and to respective bus drivers 445 and 447 to drive outbound RCLK line segment 47(out) and outbound RFRM line segment 52(out). RFRM is controlled by the signal +ERF (enable RFRM), as clocked through flip-flops 448 and 449. The extra flip-flop (relative to +ETF) provides a 250-ns delay, so that while +R1 leads +R3 by 50 ns, RFRM lags TFRM by 200 ns.

IOCP—Data Movement

FIG. 29 is a schematic of circuitry within the sub-bus interface for driving data bus 40 and tag bus 42. The four tag bits are passed through ECL/TTL converters 460 and through flip-flops 462 while the IOS bits are just passed through converters 460. The IOS and tag bits are communicated to a parity generator 467, and the resultant seven bits are communicated to bus drivers 468 for driving tag bus 42.

The data bits are communicated through ECL/TTL converters 460 and through two flip-flop stages 472 and 475 to bus drivers 477. Flip-flop stage 472 provides a 250-ns delay relative to the tag bits. Flip-flops 472 and 475 (as well as flip-flops 462) are clocked by the leading edge of +T03.

The output enable of data bus drivers 477 is controlled, in the first instance, by +EDATA (enable data), which is one of the control store data register bits. +EDATA is clocked through two flip-flop stages 480 and 482 to establish the same timing as the data. +T23 and +T01 are combined at a gating network 485. The complement of the output from network 485 is shown on FIG. 28, designated "output enable." This signal is further delayed somewhat by additional gating stages, but, when gated by the clocked +EDATA at a gate 487, defines the basic output timing for the sub-bus interface. That is, the output drivers are enabled over a major portion of the 250-ns cycle, starting generally near the leading edge of TCLK (+R3) and extending beyond the trailing edge of TCLK. Thus, the data is valid when latched by the ports' input latches 102 at the trailing edge of TCLK.

FIG. 30 is a schematic of circuitry within the sub-bus interface for receiving signals on data bus 40, ready bus 41, interrupt line 44, and error line 53. These signals, as well as the RCLK signal on RCLK line segment 47(in) are communicated through bus receivers 500, to latches 502, and are latched at the trailing edge of RCLK(in). The latch outputs are communicated to flip-flops 505 which are clocked by a TTL signal +TT2 signal derived from +T22, passed through TTL/ECL converters 507 to be made available to the SBA.

It will be appreciated that the incoming data will not be valid until a certain time interval after the tag specifying that there will be incoming data to be read is issued. To this end, the SBA asserts a signal +RECV (one of the bits in the control store data register) when there is to be incoming data associated with this operation. +RECV is clocked at a flip-flop 515, and then through a set of cascaded flip-flop stages 517, the number of such stages being adjustable according to the length of the sub-bus. The dependence on the sub-bus length arises since the incoming data is timed relative to RFRM and RCLK which must turn around at the sub-bus terminator. The output from cascaded flip-flops 517 is clocked at a flip-flop 520 by the signal +T21 to generate a signal DATA VALID once RFRM has turned around.

FIG. 31 is a schematic of circuitry within the sub-bus interface for determining the state of select line 43. As discussed above, the signal −OURBUS which conditions current source 282 for the select line is clocked at the leading edge of RFRM (+RF in the controller port). Select line 43 is terminated to ground by 100 ohms at each end. The select line is communicated to the positive input of a first comparator 525 and the negative input of a second comparator 527. The negative input of comparator 525 is held at +1 volt and the positive input of comparator 527 at +4 volts, as established by a voltage divider. Since each current source within a controller port drives 50 ma into the line, a single source driving the line will produce a 2.5 volt signal, and multiple sources will produce a signal in excess of 5 volts. The comparator outputs are clocked at flip-flops 530 by the incoming RFRM signal. The outputs from flip-flops 330 are further clocked at flip-flops 532 by the signal +TT2 (derived from +T22) which is timed to the sequencer, not the incoming data. These are passed through TTL/ECL converters 535 to provide signals +MULTIPLE and +SINGLE. In this manner, the SBA can determine whether an error condition exists due to multiple controllers conditioning their current sources to drive select line 43.

As in the case of the data, the state of the select line must be checked at a time relative to the tag that has allowed the RFRM signal to be turned around. Accordingly, the SBA asserts a signal +RSEL (one of the control store bits) which is clocked at a flip-flop 540 and through cascaded flip-flop stages 542, the number of such stages being adjustable according to the length of the sub-bus (in the manner described above). The output from stages 542 is clocked at a flip-flop 545 by +T21 to generate a signal +CHECK SELECT once RFRM has turned around.

Conclusion

In summary it may be seen that the present invention provides the circuitry for implementing a system of logical transfer channels. Once a transfer channel is attached, data transfers occur with minimal overhead (the issuance of the tags), thereby allowing bus cycles to be granted or denied very flexibly. This permits the various interleaved operations to proceed at their respective speeds while the bus runs at full speed.

While the above provides a full and complete disclosure of the preferred embodiment of the invention, various modifications, alternate constructions, and equivalents may be employed without departing from the true spirit and scope of the invention. For example, while the system shown provides four transfer channels in the context of up to 16 devices coupled to a sub-bus, these numbers are not fundamental. While the number of tag lines required would increase only logarithmically with the number of transfer channels, the number of ready lines would increase linearly. Additionally, while the use of a single interrupt line for requesting attachment of a transfer channel is in keeping with the philosophy of minimizing actual bus medium, it does entail a small front end cost by requiring the activity poll. Thus, the system of transfer channels could be implemented in conjunction with a set of radial interrupt lines, at the cost of bus medium.

Therefore, the above description and illustrations should not be construed as limiting the scope of the invention which is defined by the appended claims.

We claim:

1. A data communication system comprising:
   a plurality of up to N devices, each having an associated unit number;
   a channel processor;
   a data bus consisting of a first set of lines;
   a tag bus consisting of a second set of lines, signals on which are capable of defining at least a plurality of n bus activity codes, each of which specifies a corresponding one of a plurality of n data transfer operations, with n less than N;
   means, associated with said channel processor, for coupling said channel processor to said data bus and to said tag bus;
   means, associated with each device, for coupling the associated device to said data bus and to said tag bus;
   clock means for defining bus cycles of predetermined duration to effect synchronous operation of said channel processor and said devices with respect to signals appearing on said data bus and said tag bus;
   means for communicating request signals from said devices to said channel processor;
   a transfer channel register, associated with each device, capable assuming at least (n+1) states, with n of said states being attached states, signifying that the associated device is attached to a corresponding one of n logical transfer channels, each of which corresponds to one of the n data transfer operations, and at least one of said states being a detached state signifying that the associated device is not attached to any of the transfer channels;
   attach/detach means for attaching a transfer channel to any given device in response to a request signal from the given device to said channel processor, and for detaching the transfer channel from a given device, including
      means for setting the transfer channel register associated with the given device to one of the attached states to attach the transfer channel and to the detached state to detach the transfer channel; and
   means for effecting at least a part of a desired data transfer operation between said channel processor and a device that is attached to one of the n transfer channels, including
      means, associated with said channel processor, for placing the bus activity code that corresponds to the desired data transfer operation on said tag bus, and
      means, associated with each device, responsive to the occurrence on said tag bus of an activity code corresponding to the data transfer operation, for determining whether there exists a correspondence between the data transfer operation and the state of the associated device's transfer channel register and for allowing the associated device to transfer data between the data bus and the associated device during a predetermined number of bus cycles following the determination that there exists such a correspondence.

2. The invention of claim 1 wherein said means for communicating request signals comprises:
   a common interrupt line;

means, associated with each device, for asserting a request signal on said common interrupt line;

means, associated with each device, for setting an activity bit representative of the fact that a request signal is being asserted; and means, associated with each device, for communicating the status of said activity bit in response to a poll signal from said channel processor.

3. The invention of claim 2 wherein said means for communicating the status of said activity bit comprises means for coupling a signal representative of the status of said activity bit to a given one of said data lines, the particular data line being determined by the unit number of each device, whereupon all of said devices may provide said activity bit status during a single poll operation.

4. The invention of claim 1 wherein signals on said tag bus are further capable of defining at least one bus activity code specifying a register operation, and wherein said attach/detach means comprises:

means, associated with said channel processor, for placing a bus activity code signifying a register operation on said tag bus;

means, associated with said channel processor, for placing register control information and register data information on said data bus during at least one bus cycle following the appearance of the register operation activity code on said tag bus, said register control information including a unit number, said register data including a transfer channel number specifying one of the n transfer channels; and means, associated with each device, actuated upon the appearance of the register operation activity code, for comparing the unit number appearing on said data bus with the unit number of the associated device, and upon determining the existence of a correspondence therebetween, for setting the associated device's transfer channel register to signifying that the transfer channel corresponding to the transfer channel number included in the register data is attached.

5. The invention of claim 1, and further comprising:

a common select line;

a current source associated with each device;

current steering means, associated with each device, for selectively steering the current source of the associated device to said select line; and means, associated with said channel processor, responsive to the total current being driven on said select line, for discriminating at least between the conditions wherein no device is steering its current source to said select line, one device is steering its current source to said select line, and more than one device is steering its current source to said select line.

6. The invention of claim 5 and further comprising:

a shift register associated with each device, the shift register associated with a given device receiving as a data input a signal representative of whether said current source is being steered to drive said select line during the current bus operation, and being clocked on successive bus operations.

7. The invention of claim 6, and further comprising means, associated with each of said shift registers, for freezing the status of the associated shift register upon receipt of a lock signal originating with said channel processor.

8. The invention of claim 1, and further comprising:

a ready bus consisting of a third set of n lines;

means for coupling said channel processor and each of said devices to all the lines in said ready bus;

means, associated with each device and responsive to the state of the transfer channel register associated with that device, for asserting a channel ready signal on the line of said ready bus corresponding to the state of that device's associated transfer channel register to indicate a readiness of that device to be granted bus cycles.

9. The invention of claim 1, and further comprising:

a plurality of buffer locations associated with at least one device; and means for transferring a corresponding plurality of bus words between said data bus and said buffer locations over a corresponding plurality of consecutive bus cycles.

10. The invention of claim 1 wherein:

each device has an associated incrementable address register for specifying a data address; and said attach/detach means includes means for placing a starting address in the address register associated with the given device in conjunction with setting the given device's transfer channel register to an attached state.

11. A controller front end for a device for use in a data communication system wherein a plurality of up to N devices may communicate with a channel processor, comprising:

data bus coupler means adapted for coupling the controller front end to a data bus having a first set of lines;

tag bus coupler means adapted for coupling the controller front end to a tag bus having a second set of lines, signals on which are capable of defining at least a plurality of n bus activity codes, each of which specifies a corresponding one of a plurality of n data transfer operations, with n less than N;

timing means for defining bus cycles to effect synchronous operation of the controller front end with respect to signals appearing on the data bus and the tag bus;

a transfer channel register capable assuming at least (n+1) states, with n of said states being attached states signifying that the device is attached to a corresponding one of n logical transfer channels, each transfer channel corresponding to one of the n data transfer operations, and at least one of said states being a detached state signifying that the device is not attached to any of the transfer channels;

ready means adapted for communicating a ready signal from the device to the channel processor, with said ready signal signifying the readiness of the controller front end to transfer data between itself and the data bus;

means, responsive to the occurrence on the tag bus of an activity code corresponding to one of the data transfer operations, for determining whether there exists a correspondence between the data transfer operation and the state of said transfer channel register; and means for allowing the controller front end to transfer data between itself and the data bus during a predetermined number of bus cycles following the determination that there exists such a correspondence.

12. The invention of claim 11, and further comprising:
   means adapted for coupling said controller front end to a common interrupt line;
   means for asserting a request signal on said interrupt line;
   means for setting an activity bit representative of the fact that a request signal is being asserted; and
   means for communicating the status of said activity bit in response to a polling signal.

13. The invention of claim 12 wherein said means for communicating the status of said activity bit comprises means adapted for coupling a signal representative of the status of said activity bit to a given one of the lines of said data bus, the particular data line being determined by the unit number of said controller front end, whereupon multiple similarly configured controller front ends may provide said activity bit status during a single poll operation.

14. The invention of claim 11, and further comprising:
   a current source; and
   current steering means adapted for selectively steering said current source to a common select line;
   whereupon the total current being driven on said common select line provides a representation of the number of devices steering their respective current sources to the select line.

15. The invention of claim 14, and further comprising:
   a shift register receiving as a data input a signal representative of whether said current source is being steered to drive the select line during the current bus operation, and being clocked on successive bus operations.

16. The invention of claim 15, and further comprising means, associated with said shift register, for freezing the status of said shift register on receipt of a lock signal.

17. The invention of claim 11 wherein said ready means comprises:
   means adapted for coupling said controller front end to a ready bus consisting of a set of n lines with each of said n ready bus lines corresponding to one of said n transfer channels; and
   means, responsive to the state of said transfer channel register and operable when said transfer channel register is in one of said attached states, for asserting a channel ready signal on the line of said ready bus corresponding to the attached state to indicate a readiness to be granted bus cycles.

18. The invention of claim 11, and further comprising staging means including:
   a plurality of buffer locations; and
   means, conditioned by said means for allowing, for transferring a corresponding plurality of bus words between said data bus and said buffer locations over a corresponding plurality of consecutive bus cycles.

19. The invention of claim 18, wherein said ready means includes:
   means for sensing whether said plurality of buffer locations are ready to send or receive data.

20. An improved I/O channel bus system of the type connecting a plurality of up to N peripheral devices to an I/O channel processor (IOCP), said system comprising:
   an I/O channel bus medium for coupling said devices to said IOCP, said bus medium including a select line, a set of data lines, and a set of tag lines, signals on said tag lines being capable of defining at least a plurality of n bus activity codes, each of which specifies a corresponding one of a plurality of n data transfer operations, with n less than N;
   a system clock for defining bus cycles at a bus rate;
   means, associated with each device, for indicating a desire to communicate with said IOCP;
   means, associated with said IOCP, for determining which of said devices desires to communciate with said IOCP;
   a transfer channel register, associated with each device, capable of assuming at least (n+1) states, with n of said states being attached states signifying that the associated device is attached to a corresponding one of n logical transfer channels, each transfer channel corresponding to one of the n data transfer operations, and at least one of said states being a detached state signifying that the associated device is not attached to any of the transfer channels;
   means for performing an attached operation to assign one of the n transfer channels to a given device desiring to communicate with the IOCP, including means for setting the transfer channel register associated with the given device to one of the attached states to attach the transfer channel and to the detached state to detach the transfer channel;
   means, associated with each device, for staging data to allow the associated device to transfer a preselected number of words between the associated device and said bus medium at the bus rate;
   means, associated with each device, for indicating to said IOCP that said data staging means is ready to transfer data at the bus rate;
   means, associated with said IOCP, for placing a read/write signal that represents a given transfer channel on said tag lines;
   means, associated with each device, operable at least when the transfer channel register associated with that device is in an attached state, for determining whether the transfer channel represented by said read/write signal corresponds to the attached state of the transfer channel register;
   means, associated with each device, for generating a select signal if the given transfer channel represented by said read/write signal corresponds to the attached state of the transfer channel register of the associated device, and for placing said select signal on said select line;
   means, associated with said IOCP, for monitoring said select line to determine at least whether select signals have been generated by no devices, one device, or more than one device;
   means, associated with each device, for recording the past determinations of the associated device of whether the transfer channels represented by past read/write signals corresponded to attached states of the transfer channel register of the associated device when said past read/write signals were generated by the IOCP; and
   means associated with said IOCP for reading said recording means of each device when said means for monitoring determines that more than one device has generated a select signal.

21. The invention of claim 20 wherein said means for determining which of said devices to communicate with the IOCP comprises:

means, associated with each device, capable of defining a unique unit number for the associated device;

an activity bit register associated with each device;

means, associated with each device, for placing an activity bit in the activity bit register of the associated device when the associated device desires to communicate with said IOCP; and means, associated with each device and responsive to a poll signal from said IOCP, for placing said activity bit on a selected data bus signal line corresponding to the unique unit number associated with that device.

22. The invention of claim 21 wherein the means for staging associated with a given device comprises:

a preselected number of staging registers;

means for transferring data between said preselected number of staging registers and said given device at the data transfer rate of said given device; and means for transferring data between said preselected number of staging registers and said data bus at the bus rate.

23. The invention of claim 22 wherein said bus medium further includes a set of n ready lines, and wherein said means for indicating to said IOCP that said data staging means is ready to transfer data comprises:

means, associated with each device, for generating a ready signal when said preselected number of staging registers are ready to transfer data to said bus; and means for placing said ready signal on the ready line corresponding to the transfer channel attached to the associated device.

* * * * *